United States Patent
Bathwal et al.

(10) Patent No.: US 12,314,318 B2
(45) Date of Patent: *May 27, 2025

(54) ENHANCED SEARCHING USING FINE-TUNED MACHINE LEARNING MODELS

(71) Applicant: Snowflake Inc., Bozeman, MT (US)

(72) Inventors: Rahil Bathwal, San Francisco, CA (US); Daniel Fernando Campos, Hudson, NY (US); Ashwin Devaraj, Menlo Park, CA (US); Seth Michael Li, Foster City, CA (US); Yash Pande, San Francisco, CA (US); Vivek Raghunathan, Palo Alto, CA (US); Rajhans Samdani, Belmont, CA (US); Danmei Xu, Santa Clara, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,078

(22) Filed: Feb. 16, 2024

(65) Prior Publication Data
US 2024/0281446 A1     Aug. 22, 2024

Related U.S. Application Data

(60) Provisional application No. 63/446,750, filed on Feb. 17, 2023.

(51) Int. Cl.
*G06F 16/2457*     (2019.01)
*G06F 16/248*     (2019.01)
(Continued)

(52) U.S. Cl.
CPC .. *G06F 16/90328* (2019.01); *G06F 16/24575* (2019.01); *G06F 16/248* (2019.01);
(Continued)

(58) Field of Classification Search
CPC ......... G06F 16/90328; G06F 16/24575; G06F 16/248; G06F 16/93; G06F 16/9538; G06F 16/9558; G06F 16/345
See application file for complete search history.

(56) References Cited

U.S. PATENT DOCUMENTS 12,061,961 B2 *   8/2024   Fuerst ...................... G06N 5/02
12,159,694 B2 *   12/2024   Nie ......................... G16C 20/90
(Continued)

OTHER PUBLICATIONS

"U.S. Appl. No. 18/443,838, Preliminary Amendment filed May 21, 2024", 4 pages.
(Continued)

*Primary Examiner* — Jorge A Casanova
(74) *Attorney, Agent, or Firm* — Schwegman Lundberg & Woessner, P.A.

(57) ABSTRACT

An advanced search system leverages a pre-trained large language model to enhance user query responses. The system, equipped with hardware processors, a search query via an interface and accesses a pre-trained large language model designed to respond to the search query. The system fine-tunes the model to generate a task-specific generative model. The system employs the task-specific generative model to generate a search result to the search query and analyzes the search result based on a performance metric associated with the task-specific generative model. The system refines the task-specific generative model based on the analyzing of the search result.

20 Claims, 16 Drawing Sheets

(51) Int. Cl.
  *G06F 16/9032* (2019.01)
  *G06F 16/93* (2019.01)
  *G06F 16/9538* (2019.01)
  *G06F 16/955* (2019.01)

(52) U.S. Cl.
  CPC .......... *G06F 16/93* (2019.01); *G06F 16/9538* (2019.01); *G06F 16/9558* (2019.01)

(56) References Cited

U.S. PATENT DOCUMENTS

| | | | | |
|---|---|---|---|---|
| 2019/0180195 | A1* | 6/2019 | Terry | G06F 40/295 |
| 2020/0341976 | A1* | 10/2020 | Aggarwal | G06F 16/90332 |
| 2022/0147876 | A1* | 5/2022 | Dalli | G06N 20/00 |
| 2022/0198136 | A1* | 6/2022 | Peleg | G06F 40/253 |
| 2022/0270594 | A1* | 8/2022 | Sejpal | G06N 3/045 |
| 2022/0374608 | A1* | 11/2022 | Shazeer | G06F 40/20 |
| 2022/0374723 | A1* | 11/2022 | Blukis | G06V 10/82 |
| 2023/0079879 | A1* | 3/2023 | Gunasekara | G06F 40/56 704/251 |
| 2023/0145208 | A1* | 5/2023 | Bobu | G06N 20/00 706/12 |
| 2023/0192126 | A1* | 6/2023 | Kumavat | B60W 60/0011 |
| 2023/0360388 | A1* | 11/2023 | Singh | G06V 30/10 |
| 2023/0385085 | A1* | 11/2023 | Singh | G06N 7/01 |
| 2024/0104391 | A1* | 3/2024 | Higgins | G06F 16/338 |
| 2024/0160902 | A1* | 5/2024 | Padgett | G06N 3/0895 |
| 2024/0161017 | A1* | 5/2024 | Pisner | G16H 50/20 |
| 2024/0256762 | A1* | 8/2024 | Beauchamp | G06F 40/166 |
| 2024/0256764 | A1* | 8/2024 | Maschmeyer | G06F 16/3328 |
| 2024/0256965 | A1* | 8/2024 | Chung | G06N 20/00 |
| 2024/0265205 | A1* | 8/2024 | Goligorsky | G06F 40/205 |
| 2024/0281472 | A1* | 8/2024 | LaRhette | G06F 16/248 |

OTHER PUBLICATIONS

"U.S. Appl. No. 18/443,903, Preliminary Amendment filed May 21, 2024", 3 pages.

"U.S. Appl. No. 18/443,838, Examiner Interview Summary mailed Dec. 19, 2024", 2 pgs.

"U.S. Appl. No. 18/443,838, Response filed Dec. 19, 2024 to Non Final Office Action mailed Sep. 28, 2024", 18 pgs.

"U.S. Appl. No. 18/443,903, Examiner Interview Summary mailed Dec. 13, 2024", 2 pgs.

"U.S. Appl. No. 18/443,903, Response filed Jan. 27, 2025 to Non Final Office Action mailed Oct. 25, 2024", 18 pgs.

* cited by examiner

ENHANCED SEARCHING USING FINE-TUNED MACHINE LEARNING MODELS

CROSS-REFERENCE TO RELATED APPLICATIONS

The present application claims benefit of earlier filing date and right of priority to U.S. Provisional Patent Application Ser. No. 63/446,750, filed on Feb. 17, 2023, entitled, "SYSTEM, METHOD, AND APPARATUS FOR SEARCH ENHANCEMENT," all of the contents of which are hereby incorporated by reference herein in its entirety.

TECHNICAL FIELD

The present disclosure generally relates to special-purpose machines that use large language models and generative artificial intelligence for summarization, more specifically, to provide enhanced search capabilities using fine-tuned machine learning models.

BACKGROUND

The current state of the art in search technologies encompasses systems capable of indexing and searching through extensive collections of digital information. These systems utilize complex algorithms to analyze and rank web pages, documents, and other data sources based on their relevance to user queries. The ranking mechanisms often consider factors such as keyword frequency, site authority, and user engagement metrics.

Machine learning models, including various forms of deep learning architectures like neural networks, have been increasingly integrated into search technologies. These models are trained on large datasets to predict the relevance of content, personalize search experiences, and automate the summarization of information. Natural language processing (NLP) plays a crucial role in enhancing search capabilities, allowing for a more nuanced understanding of both the user's query and the content within the indexed data. NLP techniques enable the extraction of meaningful patterns, sentiment, and entities from text, which can improve the accuracy and contextuality of search results.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

DETAILED DESCRIPTION

Figure 1:
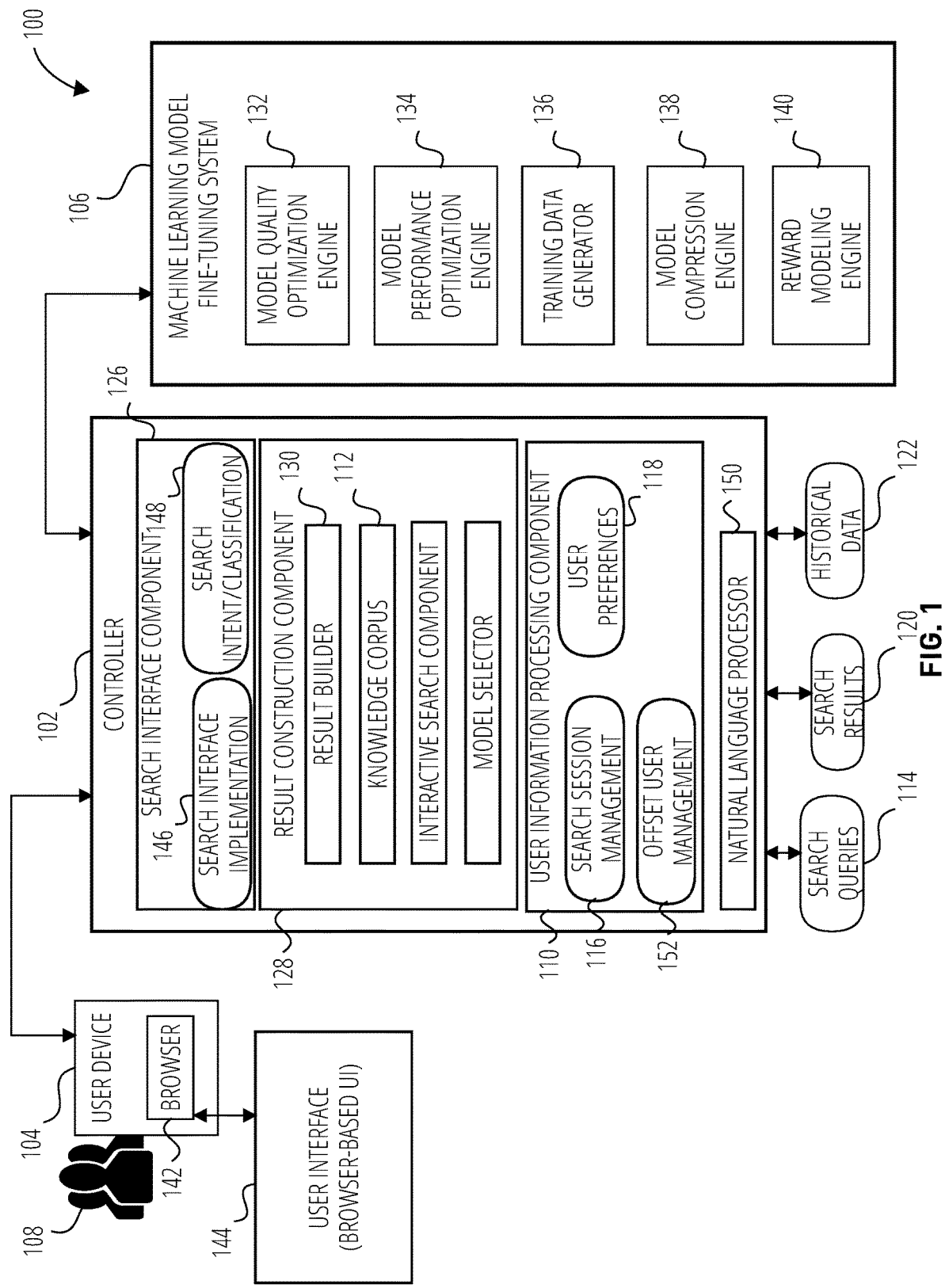
FIG. 1 is a system architecture diagram illustrating an example of a machine learning model fine-tuning system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For purposes of this description, the phrase "enhanced summarization system" may be referred to as and used interchangeably with the phrases "a multi-document summarization system," or merely "summarization system."

Disclosed herein are various examples of systems, methods, and machine-readable mediums for using an interactive interface combined with generative artificial intelligence to generate an answer to a user's query or set of queries utilizing large language models (LLMs) that have been fine-tuned into task-specific models optimized for different types of content. Examples provide techniques to create training data using LLMs, to model compression methods to reduce model size for fast inference, and to provide reward modeling to improve summarization quality. Example embodiments include machine learning models used for enhanced search capabilities using fine-tuned large language models, including the process of training and/or fine-tuning the models, the roles of large models (opposed to task-oriented models) in generating training data, and techniques for reducing model size (e.g., reducing large models to smaller, task-oriented models) for faster performance. In some examples, the user interface is a browser-based interface, but other examples can be used, such as an application-based interface or other interface; for exemplary purposes, a browser-based interface is used but a person have ordinary skill in the art will understand that any interface may similarly be implemented and used.

Existing search engine(s) fail to provide succinct, accurate, and comprehensive answers to user queries within a browser-based interface. Current search systems often require users to sift through multiple results and/or multiple pages of results and perform additional research (e.g., clicking on hyperlinks for each document) to find the information the user needs. The conventional wisdom is to prompt the one largest LLM possible to receive the best output; however, the use of one LLM causes scalability, resource, and speed problems.

To address these and other issues and shortcomings of existing search engines, example embodiments of the fine-tuning system eliminate prior inefficiencies by summarizing information from various sources into a coherent and interactive response, tailored to the user's specific query using fine-tuned machine learning models to enhance search capabilities. Task-specific generative models can leverage problem structure to run smaller, faster, and cheaper at web scale.

Disclosed herein are various examples of systems and methods for a generative artificial intelligence (GenAI) based search system that leverages machine learning models to optimize automated data generation, model compression, and reward modeling enhancements that provide for summarization, as well as applicability beyond summarization. Example embodiments provide a system for model training, model tuning, and fine-tuning processing underpinned by sophisticated machine learning models that have undergone extensive training and fine-tuning to provide increased efficacy. For example, models are adept at interpreting the nuances of natural language, enabling them to extract and synthesize information from a multitude of documents. Examples of the training process involves leveraging large, pre-existing, and new models to generate high-quality training data, which can then be used to fine-tune smaller, more efficient models tailored to specific tasks, such as summarization tasks, citation tasks, web-interface building tasks, or the like.

Examples of the model training and fine-tuning system architecture are designed to be scalable, for example, using a combination of open-source models fine-tuned with proprietary data, the system is more cost-effective and efficient than relying solely on large, expensive LLMs. The advantages of the model training and fine-tuning system disclosed herein provide a more advanced, user-friendly, and efficient solution compared to traditional search engines, driven by machine learning models that have been trained on large datasets. Examples of these models are capable of natural language understanding, allowing the models to parse and summarize complex documents. Examples of the training process include using larger models to generate training data, which is then used to fine-tune smaller, domain-specific models for efficiency.

Example embodiments of the model training and fine-tuning system provide a search system that utilizes advanced machine learning techniques to generate interactive, high-quality search results based on domain-specific models. For example, a method for improving search engine responses using machine learning models that are fine-tuned on specific datasets to provide accurate, fluent, and/or comprehensive answers derived from multiple web sources or other documents. Examples of the system employ large models for generating training data and implement techniques to reduce the size of operational models, to ensure faster performance without compromising the quality of search results.

The system further innovates model training, where it fine-tunes smaller, domain-specific models using, for example, labels generated from larger, more comprehensive models. This allows for efficient scaling and deployment of the system to handle real-time user queries with lower latency.

Additionally, the system incorporates a reward modeling component that uses heuristics and user feedback to continuously improve the quality of the generated answers, ensuring that the system adapts and evolves with use. Examples of the model training and fine-tuning system provide for enhanced multi-document summarization advancements in search technology by providing a system that not only simplifies the user's search experience but also delivers high-quality, synthesized answers that are both informative and easily digestible.

Example embodiments of the model training and fine-tuning system encompasses a system that leverages Large Language Models (LLMs) to enhance the user experience in search query responses. The LLMs employed within the system are based on sophisticated encoder-decoder architectures, which are instrumental in processing and generating natural language. These models are particularly adept at creating personalized, digestible, and comprehensive responses to search queries, thereby significantly improving the relevance and utility of the information presented to the user. In the process of training and fine-tuning these LLMs, the system utilizes supervised fine-tuning (SFT) techniques that involve the use of curated input-output pairs. This fine-tuning is further refined through human annotation and reward modeling, which aligns the models' outputs with human preferences. The training process is designed to optimize the models to maximize a mean reward, which is indicative of the models' alignment with human judgments and preferences.

The role of large models in the generation of training data is pivotal within the system. These pre-trained models are utilized to generate an initial corpus of training data, which serves as the foundation for fine-tuning smaller, more specialized models. The system employs strategies to ensure that the datasets created are diverse and of high quality, which is crucial for the effective fine-tuning of the models. Large models also serve as a benchmark for performance, providing a baseline against which the fine-tuned models can be evaluated. To enhance the system's efficiency, examples of the fine-tuning system incorporate techniques for reducing the size of the models without compromising their performance. For example, asymmetric compression techniques are implemented to decrease the model size, which in turn positively impacts inference efficiency and reduces search result latency. The performance of these reduced-size models is meticulously compared with their larger counterparts, ensuring that the reduction in size does not detrimentally affect the models' accuracy, fluency, and/or the overall user experience. This balance between size and performance is useful in the deployment of the system in real-world applications where speed and resource utilization are of paramount importance, such as in a browser-based interface.

Example embodiments of the model training and fine-tuning system can use the enhanced summarization system that provides a novel approach to search technology that significantly enhances the user experience by generating a single, comprehensive answer from multiple sources using advanced natural language processing and machine learning techniques to interpret user queries, summarize relevant information, and synthesize this information into a cohesive response including citation of the original sources within the browser-based interface, without a new webpage being generated. Example embodiments of the enhanced summarization system can stand alone or be incorporated in a technical architecture that is multi-layered framework that integrates several components, such as a search engine to retrieve relevant documents from a vast index of web pages, a summarization engine configured to summarize the content of retrieved and/or selected documents, a query processor to analyze and interpret the user's search intent, a response generator that compiles the summaries into a human-coherent answer to the user's query, cross-document summarization algorithms, and the like. The algorithms underpinning the cross-document summarization system are engineered to navigate the intricacies of discrepancies, contradictions, and the multitude of perspectives that may emerge across the document corpus. For example, the system is adept at managing information redundancy, employing advanced mechanisms to ensure that duplicate content from various documents is effectively synthesized into a cohesive summary. A salient feature of the cross-document summarization system is its robust citation and attribution framework. Unlike single document summarization, which does not necessitate the management of multiple citations for identical information, the cross-document summarization system meticulously attributes each piece of synthesized content to its respective source documents. The two-phase combination of summarization techniques according to examples of the present disclosure not only enhances the integrity and traceability of the summarized information but also enriches the user's understanding by providing a clear lineage of the content's origins.

In a second example embodiment of the present disclosure disclosed herein are various examples of systems, methods, and machine-readable mediums for using a browser-based interface combined with generative artificial intelligence (GenAI or GAI) to provide an interactive search component. Examples of the interactive search component of a user interface provide for real-time or near real-time adjustment of parameters (e.g., source type, trust level, etc.), interactive formatting preferences for user query results (e.g., final summarized answer to a user query), and interactive clarifying questions to refine search intent, all within the browser-based interface. For example, examples provide user interface functionality including real-time control over query results (e.g., search answers), clarification dialogs to improve search results within the browser-based interface, and user-feedback system outputs to provide the user for providing continuous user feedback on system status and outputs all without leaving the browser-based interface.

Current web search engine(s) operate through a systematic process that involves crawling, indexing, and retrieving information from the World Wide Web to present relevant results in response to user queries. The search engine deploys automated programs (commonly referred to as "crawlers" or "spiders") that traverse the web by following hyperlinks from one web page to another. These crawlers systematically browse the web to discover and access publicly available web pages. The crawling process is guided by algorithms that determine the frequency, path, and number of pages to crawl. Once a web page is accessed, the search engine processes and analyzes the content of the page to understand its subject matter. Key elements such as text, images, and video content are extracted, and the information is organized in a database known as an "index." This index is designed to efficiently store and retrieve data, with the content being categorized based on keywords, tags, and other relevant metadata. Common search engines employ complex ranking algorithm(s) to evaluate the relevance and authority of web pages in relation to specific search queries. Factors that may influence ranking include keyword density, the quality and quantity of inbound links, user engagement metrics, website speed, mobile friendliness, the freshness of content, and the like. The algorithm(s) assign a rank to each web page within the index, which determines the order in which pages are presented in search results.

When a user enters a search query into a search query input field (commonly referred to as a "search box," an "input box," or "search bar," the search engine processes the query by parsing and understanding the user's intent. The query processing component may include natural language processing (NLP) techniques to handle complex queries, synonyms, and context. Based on the processed query, the search engine retrieves the most relevant web pages from the index. The retrieval mechanism uses the ranking algorithm(s) to select and order the pages that best match the user's query. The search engine presents the retrieved results to the user through a user interface, typically a web page that displays a list of search results. Each result is simply a snippet of information about the web page, generally including a title, a URL, and a brief description or excerpt from the web page. The interface may also offer advanced search options and filters to refine the results. Modern search engines incorporate machine learning algorithms that analyze user interaction with search results (e.g., click-through rates, time spent on a page, etc.) to continuously improve the relevance and accuracy of the search results.

Previously known search tools and systems suffered from a number of challenges that result in users getting sub-optimal search results, getting partial returns for search results, and spending excessive time getting effective search results, as well as parsing through multiple search results to get all of the information they are looking for. Search technologies have evolved to index and retrieve vast amounts of data from the web, offering users access to a wide range of information. Existing technologies typically employ algorithms to rank search results based on relevance to the user's query. The indexed information may come from diverse sources, including web pages, databases, and specialized documents; however, the output of a web search using these existing technologies requires a user to individually open and review tens to hundreds of hyperlinks and web pages. Over time, advancements in natural language processing have enabled more sophisticated interpretations of user queries and the content of potential search results. The primary challenge in existing search technologies includes the inadequacy of existing search engines to provide succinct, accurate, and comprehensive answers to user queries using machine learning optimizations.

The present web search technologies encounter difficulties when processing user queries that are vague or possess multiple interpretations, leading to challenges in discerning the true intent of the user. Current search engines may yield search results that lack relevance or contain low-quality information, such as outdated or incorrect data. The algorithms governing search engine operations may unintentionally exhibit bias towards certain websites or sources. Search engines that rely heavily on keywords may overlook the broader context of user queries. While personalization in search results can enhance user experience, it can also lead to the creation of "filter bubbles," limiting exposure to diverse information. The indexing of non-textual content such as images, videos, and audio by search engines is often less effective than textual content. Search engines may exhibit suboptimal performance in non-English languages or in regions with lower levels of internet access. Further, search results are often polluted with spam or low-quality content that manipulates search engine ranking and/or filtering.

Examples of the present disclosure overcome the existing technological difficulties by introducing an interactive user interface in a browser-based interface, a novel methodology that represents a significant departure from the existing web search technologies. This methodology incorporates unique processes, algorithms, or systems that address existing challenges including interactive user interface functionality in the browser-based interface, without a new webpage being generated. The examples of the interactive user interface system provide advanced technical solutions that enhance performance, efficiency, and/or user experience beyond the current state of the art. The example embodiments further feature an unprecedented integration of components or systems that synergistically produce enhanced results to user queries in the browser-based interface, without a new webpage being generated. The interconnectivity and interaction between these components provide technical advantages and benefits, including improvements in speed, accuracy, reliability, scalability, user engagement, cost-effectiveness, or other measurable metrics related to user query and result output in the browser-based interface.

For example, the system's ability to handle summarization is a standout feature that leverages advanced machine learning techniques to process and condense information from various documents into concise summaries. While example embodiments of the present disclosure are provided with reference to an enhanced summarization system, it will be understood by those having ordinary skill in the art that the model training and fine-tuning system and/or the interactive user interface system described herein can be used on other systems outside the realm of summarization.

FIG. 1 is an example high-level system architecture illustrating an example of a machine learning model fine-tuning system 106 including a controller 102 embodying circuits, controllers, computing devices, data stores, communication infrastructure (e.g., network connections, protocols, etc.), or the like that implement operations described herein, in accordance with some embodiments of the present disclosure.

As utilized herein, circuits, controllers, computing devices, components, modules, or other similar aspects set forth herein should be understood broadly. Such terminology is utilized to highlight that the related hardware devices may be configured in a number of arrangements, and include any hardware configured to perform the operations herein. Any such devices may be a single device, a distributed device, and/or implemented as any hardware configuration to perform the described operations. In certain embodiments, hardware devices may include computing devices of any type, logic circuits, input/output devices, processors, sensors, actuators, web-based servers, LAN servers, WLAN servers, cloud computing devices, memory storage of any type, and/or aspects embodied as instructions stored on a computer readable medium and configured to cause a processor to perform recited operations. Communication between devices, whether inter-communication (e.g., a user device 104 communicating with the controller 102) or intra-device communication (e.g., one circuit or component of the controller 102 communicating with another circuit or component of the controller 102) may be performed in any manner, for example using internet-based communication, LAN/WLAN communication, direct networking communication, Wi-Fi communication, or the like.

The example controller 102 is configured to provide enhanced search results to the user device 104, based on a knowledge corpus 112 of information available to the controller 102. The example knowledge corpus 112 may be any type of knowledge base of documents, for example the entire public internet (e.g., based on a web index built by a web crawler). An example knowledge corpus 112 includes one or more aspects such as web accessible documents, proprietary database information (e.g., a database for a company, engineering documents, a subscription-based information data set, etc.), specific knowledge bases (e.g., journals, white papers, or the like), and/or additional data sources. The operations of the system architecture 100 may be performed on any corpus of documents and may be utilized for general search purposes (e.g., a user searching the internet) and/or for specific search purposes (e.g., a user searching a specific corpus of documents to determine responsive information that may be present therein).

The example controller 102 interfaces with a user device 104, for example associated with a user 108, to receive search queries, user preferences, user response to search results (e.g., selection of certain returns, pursuing links, further search queries, etc.) of any type as set forth herein, and interfaces with the machine learning model fine-tuning system 106. The user device 104, controller 102, and machine learning model fine-tuning system 106 are shown as separate devices for clarity of the present description, but these may be on distinct devices, on the same device in whole or part (e.g., a part, or all, of the machine learning model fine-tuning system 106 stored on the controller 102, for example where a proprietary database is stored on a same device, web server, or the like as the controller 102; where a proprietary database is stored on a same device, web server, or the like as the user device 104; and/or where one or more circuits, components, or other aspects of the controller 102 are positioned, in whole or part, on the user device 104).

The machine learning model fine-tuning system 106 includes a model quality optimization engine 132, a model performance optimization engine 134, a training data generator 136, a model compression engine 138 (described in detail in connection with FIG. 6), and a reward modeling engine 140 (described in detail in connection with FIG. 7) to help refine large language models into task-specific (e.g., domain-specific) generative models. The model quality optimization engine 132 improves the overall quality of the LLM's and/or task-specific generative model (e.g., smaller model) outputs. 'Quality' can encompass various attributes, for example and not limitation, such as coherence, relevance, factual accuracy, and fluency of the generated text. The optimization engine uses techniques like hyperparameter tuning, architecture search, or advanced training strategies to refine the model's ability to produce high-quality results. The model performance optimization engine 134 improves the performance of the systems and models presented throughout, such as improving the computational aspects related to model performance, for example, speed, efficiency, and resource usage of the model. A model performance optimization engine enhances how well the model runs, focusing on reducing latency, optimizing memory usage, and improving throughput. Techniques include model pruning, quantization, and knowledge distillation, which help make the model smaller and faster without significantly compromising its predictive capabilities. The training data generator 136 is responsible for creating the datasets used to train or fine-tune the LLMs. A training data generator might automate the collection, cleaning, and labeling of data, ensuring that the model has a diverse and representative set of examples to learn from. It can involve techniques like data scraping, synthetic data generation, or semi-supervised learning approaches where the model itself helps to generate new training examples.

The example controller 102 finds responsive results in the knowledge corpus 112, constructs a search result via a result builder 130, provides the search result to the user device via a user interface 144 of a browser 142 of the user device 104, and/or receives feedback from the user to perform further searching or the like. According to example embodiments, the controller 102 includes a search interface component 126 that implements a search interface on the user device 104, for example providing a search query window, providing the user interface 144 for the user to indicate preferences, to select aspects of the search result(s), to receive suggestions from the controller 102, or the like.

In certain embodiments, the search interface component 126 interprets responsive information from the user (e.g., receiving and/or processing search terms for queries), interprets user inputs related to preferences for searching (e.g., interface display and/or arrangement, priorities to be applied to certain aspects herein such as trust determinations for sources, treatment of certain content types such as machine generated content; and/or configuration options for returned search results such as number of results to be returned, citation options, thresholds for classification or other determinations, or the like), interprets other data related to the user interface experience (e.g., where the user focus is, for example, based on cursor locations and/or user eye positioning determined from a camera, and/or time the user spends on aspects such as time to enter a query, time spent reading or following source elements), and/or stores user interaction information for further use by the system architecture 100 within the same or a subsequent search session, or the like).

In certain embodiments, the search interface component 126 creates and/or operates within a single session, for example, a user searching within a single window of a web browser 142, and/or can operate across multiple sessions sequentially (e.g., using search history after the browser is closed and reopened) and/or simultaneously (e.g., the user is performing two searches in separate windows, tabs, and/or on separate user devices). In certain embodiments, the search interface component 126 provides search results to the user, for example, providing the constructed search results to the window being accessed by the user. The example controller 102 interprets search queries 114, historical data 122, and/or provides constructed search results 120 to the user via the browser 142. Interpreted parameters may be explicit (e.g., as entered by the user), inferred (e.g., adjusted spelling of terms, based on observed data from the user rather than explicitly entered information, etc.), and/or combinations thereof.

Examples of the search interface component 126 further include a search interface implementation 146 component and a search intent and classification 148 component that perform additional operations related to search queries. For example, the search interface implementation 146 performs operations to provide the search interface to the user 108, for the user to indicate preferences and respond to search results, and/or to provide constructed search results to the user. The example search interface component 126 further includes a search intent and classification 148 component, that parses the search query for specific terms, and/or that provides one or more classifications for the query, which may be utilized to determine which sources in the knowledge corpus 112 should be utilized, what the purpose of the search is, which type of information is most responsive to the search, etc. The search intent and classification 148 component may utilize any type of classifier and/or intent determiner known in the art. In certain embodiments, multiple intents and/or classifications of the search query may be determined and/or ranked and used to determine which answer or answers to construct.

The example controller 102 includes a result construction component 128 that queries the knowledge corpus 112 for responsive documents to a search, parses the documents for responsive portions (e.g., sentences, paragraphs, phrases, tables, graphical information, etc.), constructs a single best answer that is responsive to the search, and provides the single best answer to the user responsive to the search. As utilized herein, a single best answer (referred to as "exactly one answer") includes a search result that is constructed to be responsive to the user search, and may include elements from multiple source documents, with citations within the single best answer to the multiple source documents utilized to construct the answer. In example embodiments, aspects from the multiple source documents may be processed to determine the responsive information, for example, including paraphrasing, summarizing, aggregating, or otherwise including derived information from the multiple source documents to create a responsive result. In example embodiments, the result construction component 128 may include more than one, or many, "single best answers," for example, where a classification of the search query indicates that multiple intents may be present, an example result construction component 128 may construct a single best answer for more than one (or all) of the intents. In example embodiments, for example where more than one single best answer is provided, information may be provided to the user about each of the answers (e.g., including language related to the intent determination for each answer). In certain embodiments, information may be provided to the user for a single best answer where only one is provided, for example, a described intent that is determined for the query may be provided to the user, for example to enhance the user confidence that the query was understood and that the search results are likely to be the best results.

In example embodiments, determined intents may be provided to the user, and/or accessible to the user for confirmation, modification, or the like; for example, allowing the user to explicitly adjust the intent and repeat the search. In certain embodiments, the result construction component 128 further combines the search result elements into a cohesive answer, for example as a paragraph, page, sentence, graph, or the like. In certain embodiments, the controller 102 includes a Natural Language Processor 150, which may be available to any other aspect or component of the controller 102, for example to be utilized by the result construction component 128 to adjust the single best answer into a naturally readable answer, to parse the search query into specific terms, indicated intents, classification of the query, or the like. The example single best answer as set forth herein is an abstracted answer, for example, an answer including derivative information from a number of references, where one or more elements of the answer may not appear individually within any single reference, as opposed to an extractive answer where the best available single source is provided to the user. In certain embodiments, search results may additionally include one or more extractive answers, for example provided as additional search results below the single best answer (or single best answers).

The example controller 102 includes a user information processing search interface component 126 that interprets and/or stores user information utilized by aspects of the system architecture 100, for example determining user intents, user behavior, user search history, user preferences, or the like. In certain embodiments, the user information processing search interface component 126 is further able to integrate user information from offset users (e.g., other users that have a similarity to the current user, for example based on a classification of the user type, similarity in search terminology and/or search logic, similarity in search responses such as the type of sources trusted, language in responses that the user tends to favor as responsive, etc.). The user type may be a classification related to the user that can be utilized to inform responsive search results, and may be based upon characteristics of the user (e.g., user education level, user history favoring certain document types such as news, academic papers, articles from particular industry, etc.) and/or the context of the user search operations (e.g., professional user, academic user, casual user, traveling user, etc.), including aspects such as the device being used by the user, the time of day, the geographic location of the user, etc. While the user type, user characteristics, and/or user context may be utilized to enhance search servicing herein, aspects of the present disclosure are nevertheless beneficial to user interactions where no information is available about the specific user, for example basing operations to parse and classify queries and/or construct answers based on only information available about the user through interactions within a single searching session.

Returning to the controller 102, the controller includes the result construction component 128, which includes a result parsing component (not shown), which performs operations to parse potentially responsive documents for relevant data, text, tables, figures, or the like. Operations to parse potentially responsive documents may include providing a vector description of elements of the potentially responsive documents, allowing for identification of relevant portions, as well as determining which elements to utilize in constructing an answer. The example results construction component 128 includes a result builder 130 component, which determines which elements to include in the answer, ordering of the elements, combination of elements into single sentences, paragraphs, and/or visual elements, or the like. In example embodiments, the result builder 130 component accesses the Natural Language Processor 150, which may be utilized to finalize the answer into a natural reading information packet: for example, as sentences, paragraphs, illustrations, and/or as a web page or other document.

In example embodiments, the result construction component 128 can paraphrase, summarize, aggregate, or otherwise derive information from the sources, for example to focus on aspects of the sources that are responsive to the search query, and/or to construct an answer from a number of sources that, taken together, are responsive to the search query even where none of the individual references are responsive to the specific query. For example, a first source document may have a capacity description for a container, and a second source document may have a volume description for a commodity, where the result construction component 128 is capable of answering a query about how much of the commodity can be stored in the container. The example results construction component 128 includes a citation processor (not shown) component that incorporates citations into the constructed answer, for example using linked text (e.g., text elements from the source that are hyperlinked to the source), footnotes, or the like. The utilization of citations ensures that proper attribution is given to the source documents, enhances user confidence in the answer, and/or provides the user with additional original sources for further research.

The example user information processing component 110 operates on any type of user information as set forth throughout the present disclosure. An example user information processing component 110 includes user preferences 118 and/or search session management 116. Any or all of this information may be explicit (e.g., provided by the user), inferred (e.g., based on user interactions and/or other information available about the user such as in a profile of the user stored by the system architecture 100, available from public information such as public records, social media information, or the like, inferred from correlations with other information about the user (e.g., a user that is an engineer searching about an engineering topic may be more likely to be a "professional" user rather than a "casual" user in that context), and/or combinations thereof. This user information search session management 116 and/or user preferences 118 may additionally or alternatively be based on the context of the user, such as time of day, which browser is being utilized, which user device is being utilized, etc. Inferred information and/or context may be further modified by pattern recognition operations, for example when the user performs searches at a certain time of day, day of the week, using certain search terms, or the like, patterns may be recognized indicating intents or classifications for searches, the types of documents the user is looking for, and the like.

Additional example embodiments utilize user activity data (not shown) to adjust search query answers and/or other determinations throughout the present disclosure. In certain embodiments, user activity history may be determined from search query terms and/or the progression thereof, aspects of interest to the user within the results found (e.g., determined by cursor location, scrolling operations of the user, position of text on a page, for example centered text may be more likely to be the focus of the user, active attention of the user, for example based on terms from the answer that are highlighted, hovered over, and/or typed into a search interface, and/or passive attention of the user, for example text that is located in the center of the view, text that the user is looking at based on eye position of the user, and/or text that is being incrementally exposed by the user through scrolling operations, etc.), and/or confidence in the applicability of the user interest data (e.g., a high confidence single answer that is also accessed quickly by the user can be a strong indicator that the ranking, classification, intent determination, etc. was correctly performed). In additional examples, the user activity history can be provided by historical data 122 provided by the user 108. In certain embodiments, user response times (e.g., time to click a link, begin an additional search, etc.) may be used as an indicator of single answer success (or lack of success). In certain embodiments, user dwell times (e.g., time spent with certain content) may be used as an indicator of single answer success (or lack of success). The scope of user history utilization in configuring single answers, classifying queries, determining intents, applying user preferences, or the like, may be built around a single search query event, around the entire history of the user (e.g., based on the user's profile, all data available from the user device, etc.), based on a reset operation of the user (e.g., initializing a new session), threaded into simultaneous separate sessions, based on a discontinuous session determination, or the like. The scope of user history utilization may be differential for different aspects, for example applying a permanent (or persistent) adjustment to certain operations such as inferred user preferences for formatting, and utilizing a session based (or temporary) adjustment to classification of a user search query. In some examples, the scope of user history utilization may be differential for different types of user information, for example using one user history corpus for casual searches by the user and using another user history corpus for professional searches by the user.

The example user information processing component 110 further includes an offset user management 152 component, for example allowing the controller 102 to utilize information from offset users that have similarity to the user (e.g., based on user characteristics, user information, and/or user context), and may adjust any operations herein utilizing the offset user information. Example operations that may be adjusted utilizing information from offset users includes, for example and without limitation, classifying and/or determining an intent of a search query, tracking user patterns and/or trajectories (e.g., determining which context elements may be indicating a particular pattern, and/or following a search trajectory which may be utilized to help the user more quickly find the information they need), and/or inferring user information and/or preferences, for example where explicit versions of this information are not available.

The example user information processing component 110 further includes a search session management 116 component that determines the scope of relevant search history information to be utilized for making determinations about the user intent, determining appropriate sources, determining responsive content, etc. For example, a search session management 116 component may limit considerations to the particular browser instance and search terms utilized, in the example clearing the search history, at least for consideration of the search history to be considered for a particular search query, upon the closing of a browser, tab, or window of an application. In another example, a search session management 116 component may include considerations from prior search sessions within a current session, for example where it is detected that a search session is interrupted (e.g., browser abruptly closed without any search results being interacted with, upon a computer crash, upon a power loss event, etc.), and/or where search terms indicate a continuing pattern is detected from prior search terms in another session.

In another example, a search session management 116 component may split a given physical session (e.g., a single instance of search terms entered into a single browser) into two or more "sessions," for example, where the user appears to be searching multiple concepts, not necessarily in continuous sequence. For example, if a user 108 is searching for cosmological data, begins searching for houses available to buy in South Carolina, and returns to searching for cosmological data, the search session management 116 component may determine that multiple search threads are being exercised, and divide the data into first session data for the cosmological data, and second session data for the house availability data. In example embodiments, classification and/or intent determinations for the search queries submitted may be utilized to determine that multiple search threads are being exercised, and/or for organizing information from those threads into sessions. Accordingly, a given user performing searches for different things can receive the benefit of distinct determinations for user type, context determined information, and the like, without having to exercise multiple physical sessions, utilize separate browsers, clear a search session, or the like. Further, the operations of the search session management 116 allow for a user to get the benefits from information determined in prior physical sessions when they return to a search topic, even on a different day, different device, different browser, or the like.

The example result builder 130 component includes a result sampler that determines active constituents of potential search results, for example determining sentences, words, phrases, graphics, or other elements from a source that may be responsive to the search query. The example result builder 130 component includes a result processing component (not shown), for example that determines the relevance of the active constituents, which constituents are best suited for inclusion into the answer, which sources are the best or most trusted for the user, or the like. The example result builder 130 component includes a result integration component (not shown), for example that determines the order, format (e.g., paraphrase, direct quote, inclusion within a sentence, inclusion as a graphical element, etc.), and other arrangement of the selected active constituents into the answer. The example result builder 130 component includes a result completion component (not shown), for example using the Natural Language Processor 150 to build out the final answer for presentation to the user. In example embodiments, the result completion component provides formatting for citations, and/or arranges the answer in a desired manner (e.g., applying headers or other navigation elements).

Figure 2:
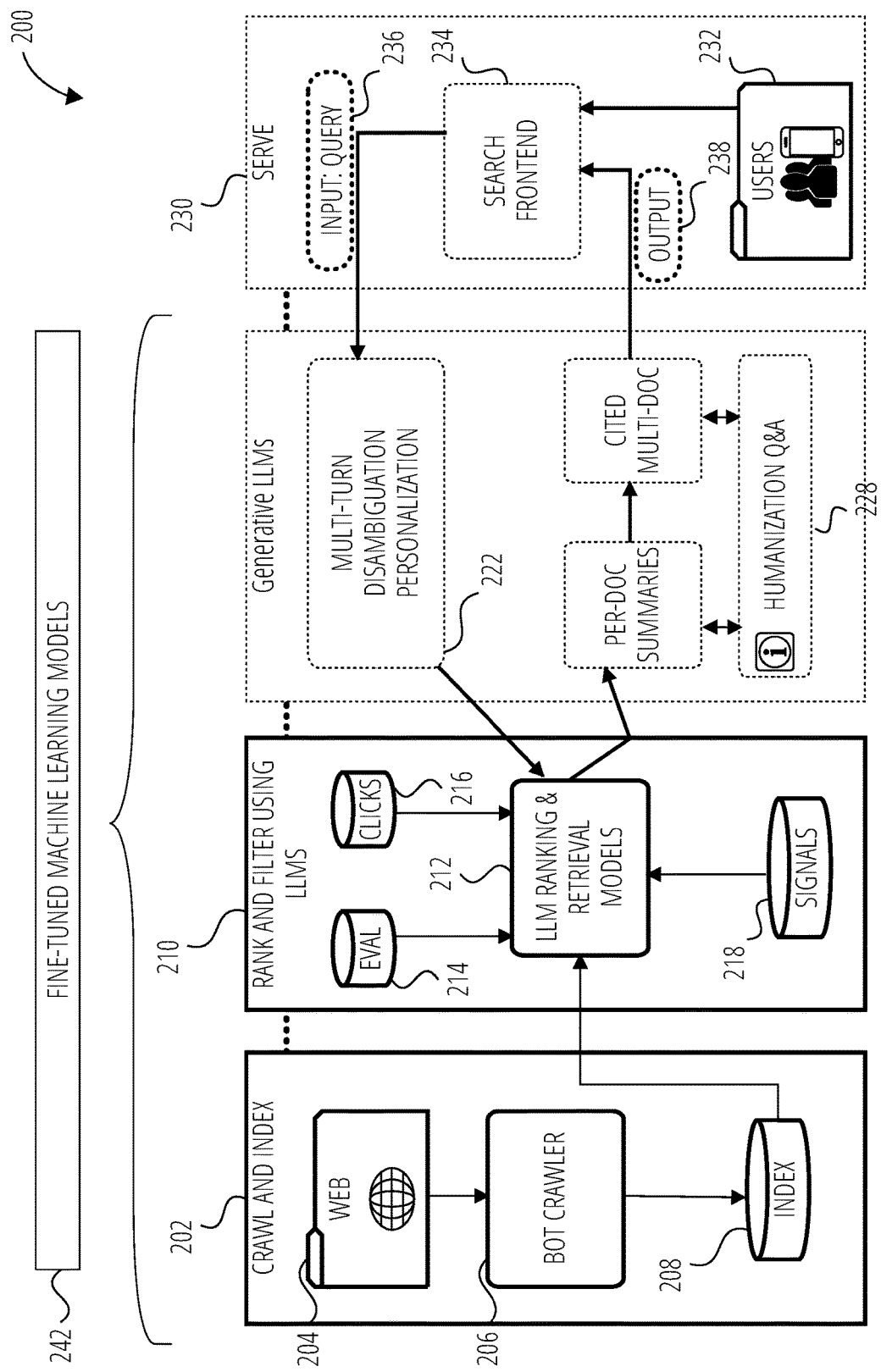
FIG. 2 is a data flow diagram illustrating data movement through a fine-tuning system and interactive user interface, according to some example embodiments.

FIG. 2 is an example high-level data flow diagram 200 illustrating how data moves through the fine-tuning system and interactive browser-based user interface, in accordance with some embodiments of the present disclosure. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the data flow diagram 200 to facilitate additional functionality that is not specifically described herein.

Example embodiments encompass an advanced interactive system utilizing generative large language models (LLMs) to fine-tune LLMs 242 into task-specific generative models. In some examples, the indexing can be performed offline. In additional examples, this is performed directly in the browser and enables the system to provide real-time updated results as output 238 to the user 232. The system employs sophisticated algorithms to analyze the user's input and context, leveraging historical data, user preferences, and behavioral patterns to personalize subsequent interactions, as described and depicted in connection with the user information processing component 110 of FIG. 1.

In the present disclosure, the architecture of the fine-tuning system is composed of several key components, each playing a pivotal role in the processing and delivery of search results. At its core, the system utilizes advanced language models that have been fine-tuned on domain-specific data to ensure accuracy and relevance. The architecture facilitates seamless data flow from the initial query input 236 to the final summarized output 238, integrating various subsystems such as query analysis, document retrieval, summarization, and result presentation.

The data flow diagram 200 begins with a serving component 230, including a user 232 providing an input 236, such as a query, via a search frontend 234 interface, such as a web browser on a user's device. The input 236 query is provided to a multi-turn disambiguation personalization layer 222 to process the user's query.

According to the data flow diagram 200, the fine-tuning system fine-tunes LLMs 242 into task-specific generative models beginning by making a copy of documents on the Internet or portions of documents available on the Internet via a crawl and index system 202. The crawl and index system 202 includes a bot crawler 206 receiving documents from the web 204 and indexing the documents in an index 208. After the documents are indexed, the crawl and index system 202 moves to a second step to determine which documents are useful for a given purpose (e.g., summarization, user intent, user query, etc.) by ranking and/or filtering the documents using large language models and retrieving task-specific models 212.

Examples of the rank and filter system 210 can include using evaluation 214, clicks 216, signals 218, and/or other aspects of the ranking process when ranking documents using LLMs. For example, the evaluation 214 process can evaluate the relevance and/or quality of the search results produced by the LLM (e.g., where evaluation metrics are used to assess how well the model's output matches the user's intent). Evaluation metrics can include, for example and without limitation, coverage, coherence, fluency, accuracy, neutrality/bias, and the like. These metrics provide objective benchmarks for the model's performance and can guide the fine-tuning process. By monitoring evaluation metrics, developers can identify areas where the model needs improvement and adjust the training process accordingly, such as changing the loss function, modifying the training data, or altering the model architecture. In additional examples, other metrics may be used, such as automated metrics, human metrics, manual metrics, and the like.

The clicks 216, in the context of search engines, can be measured to determine user interaction with the search results (e.g., where tracking click metrics can provide valuable feedback on the effectiveness of the ranking algorithm(s). The signals 218 include various types of data (e.g., indicators) that the ranking algorithm(s) use to determine the relevance and quality of documents in relation to a search query. Signals can include a variety of factors, for example, document freshness, domain authority, personalization factors (e.g., search history, user location, etc.), keyword matches, and the like. The rank and filter system 210 using the LLM ranking and retrieval models 212 can process one or more signals to understand the content of documents and the context of queries better, ultimately leading to improved ranking of search results.

Through this dynamic and adaptive approach, the system ensures that the final output is not only disambiguated, reflecting a precise interpretation of the user's input 236 (e.g., query, request, etc.), but also customized to align with the user's unique profile, thereby enhancing the overall user experience and satisfaction with the search or conversational AI system. In additional examples, the system engages in a series of iterative dialogues with the user, via a question asked by a human user (humanization question) and answer 228 module, to resolve ambiguities inherent in user queries.

Examples of the system incorporate efficient algorithms that are inherently designed with lower computational complexity and are further fine-tuned through algorithmic optimizations to expedite processing speed. To bolster retrieval efficiency, the system implements caching and indexing mechanisms, which store frequently requested information and employ indexing techniques to swiftly fetch pertinent documents, reducing the necessity for exhaustive corpus processing. Last, resource allocation can be dynamically managed, with computational resources being judiciously distributed in accordance with the intricacy of the document set and the demands of the task. By weaving together these multifaceted approaches, the system ensures robust performance and scalability, all the while judiciously managing computational expenditures.

Figure 3:
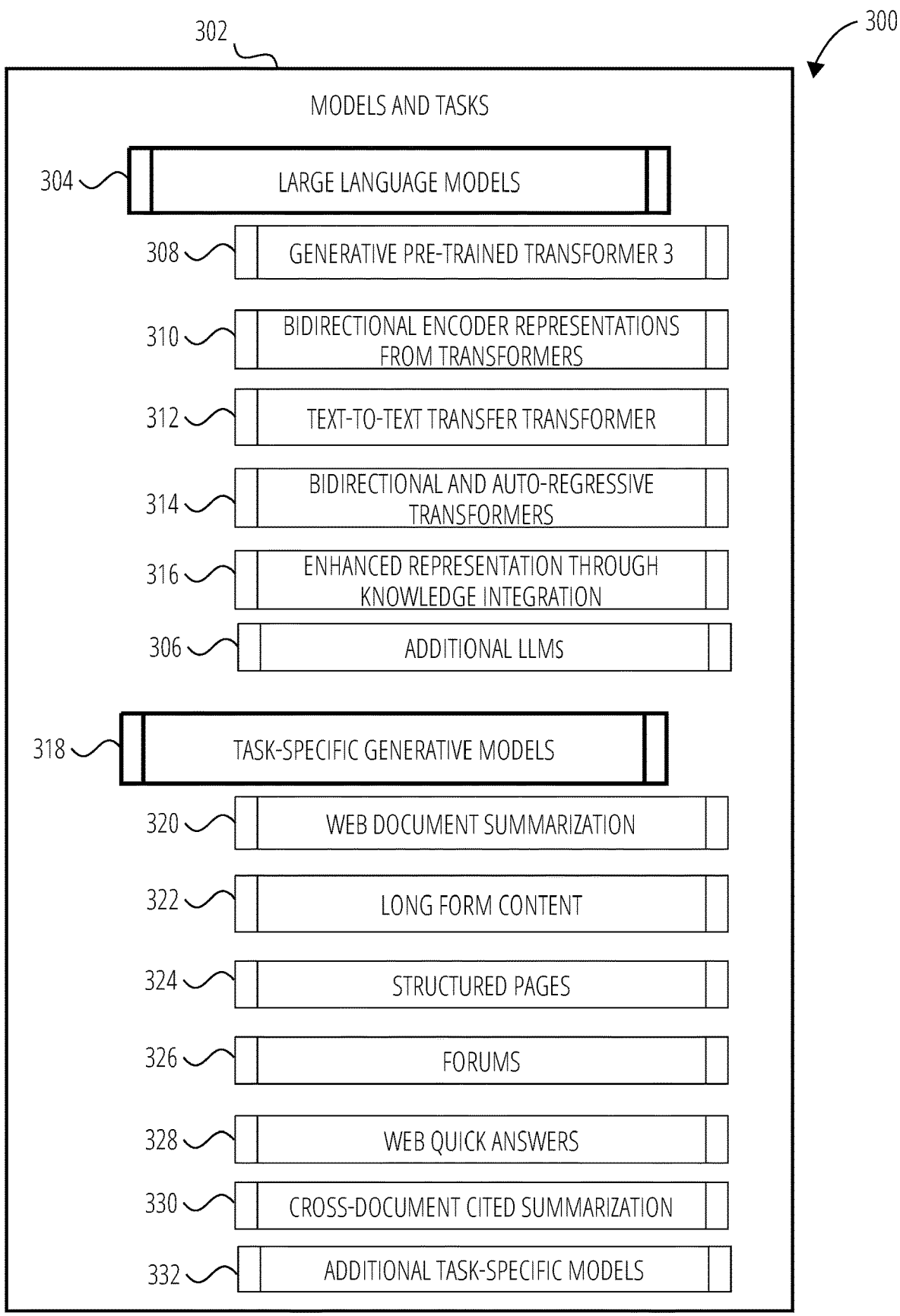
FIG. 3 is a block diagram illustrating a large language model and task-specific generative model paradigm, according to some example embodiments.

FIG. 3 is an example block diagram 300 illustrating a large language model and task-specific generative model 302 paradigm, in accordance with some embodiments of the present disclosure. It is understood that the block diagram 300 shows examples of LLMs and task-specific models, but other models can be used and/or fine-tuned according to embodiments presented throughout.

The machine learning model fine-tuning system utilizes a variety of large and small models to execute operations (e.g., tasks) to advance computational linguistics, generative artificial intelligence, and artificial intelligence. Large and small models serve a multitude of functions including Natural Language Understanding (NLU) for sentiment analysis, entity recognition, and classification; Natural Language Generation (NLG) for automated content creation and dialogue systems; machine translation for multilingual communication; abstractive and extractive summarization of extensive documents; sophisticated question answering systems; enhancement of search engine algorithms through improved query interpretation and result ranking; code synthesis and debugging in software development; legal document analysis and compliance verification; personalized educational content generation and tutoring systems; medical text interpretation and diagnostic assistance; creative writing aids for generating literary content; accessibility tools for real-time captioning and reading assistance; and unstructured data analysis for extracting actionable business intelligence. The integration of machine learning models into these domains underscores their significance in the development of intelligent systems capable of processing and emulating human language with remarkable efficacy.

However, as noted above, LLMs encounter challenges and limitations for many operations, requiring the use of intensive computation resources, causing biases, misinterpret complex queries (e.g., idioms, sarcasm, etc.), and the like. The complexity of large language models makes it difficult to understand how the LLM arrives at certain outputs and struggle to capture a user's intent, especially for ambiguous queries or those requiring domain-specific knowledge. Because of these challenges, example embodiments of the machine learning model fine-tuning system can take the large language models 304 and turn one or more of the LLMs into a task-specific model typically through a process known as fine-tuning (described and depicted in detail in connection with FIG. 4). Generally, fine-tuning is a transfer learning technique where a pre-trained model is further trained on a smaller, task-specific dataset. This process allows the model to adapt its knowledge to the particularities of the desired task. For purposes of example and not limitation, one task-specific model can be fine-tuned to provide individual web page summarization and the amalgamation of these summaries into a single answer.

For example, models are fine-tuned using proprietary datasets, which imparts a unique aspect to the system's operation. The fine-tuning of open-source models with proprietary data is a distinctive feature that contributes to the system's novelty. A significant challenge addressed by the system is the ambiguity inherent in certain queries that could potentially refer to multiple entities. The system employs sophisticated techniques to prevent the conflation of unrelated information into a single answer, thereby ensuring the accuracy and relevance of the synthesized information.

The system's architecture is designed for scalability and efficiency, leveraging machine learning techniques for fine-tuning models and implementing asymmetric compression to reduce model size. This results in lower latency during the serving of results, ensuring that the search remains interactive even when processing large volumes of data. Examples of the system's approach to training smaller models by generating labels from larger models is highlighted as a general architecture employed across various summarization tasks. The system is further employed to generate structured summaries for domain-specific pages, such as IMDB or AMAZON, where structured information extraction is more beneficial than text-only summaries. This capability allows the system to present information in a user-friendly format that is tailored to the specific type of page being summarized, without the immense computational resource requirements and other challenges faced by large language models.

The block diagram 300 comprises a large language model and task-specific generative model 302 paradigm including a large language models 304 listing and a task-specific generative models 318 listing. The large language models 304 listing includes examples of LLMs, such as a Generative Pre-trained Transformer 3 308 (GPT-3), a Bidirectional Encoder Representations from Transformers 310 (BERT), a Text-to-Text Transfer Transformer 312 (T5), a Bidirectional and Auto-Regressive Transformers 314 (BART), an Enhanced Representation through kNowledge Integration 316 (ERNIE), and additional LLMs 306.

According to example embodiments, one or more of the LLMs in the large language models 304 listing can be fine-tuned into one or more task-specific generative models 318. For example, the task-specific generative models 318 listing includes examples of smaller models, which can be used for domain-specific or more particular tasks. The task-specific generative models 318 listing includes examples of task-specific models, such as a web document summarization 320 model, a long form content 322 model, a structured pages 324 model, a forums 326 model, a web quick answers 328 model, a cross-document cited summarization 330 model, and an additional task-specific models 332.

Figure 4:
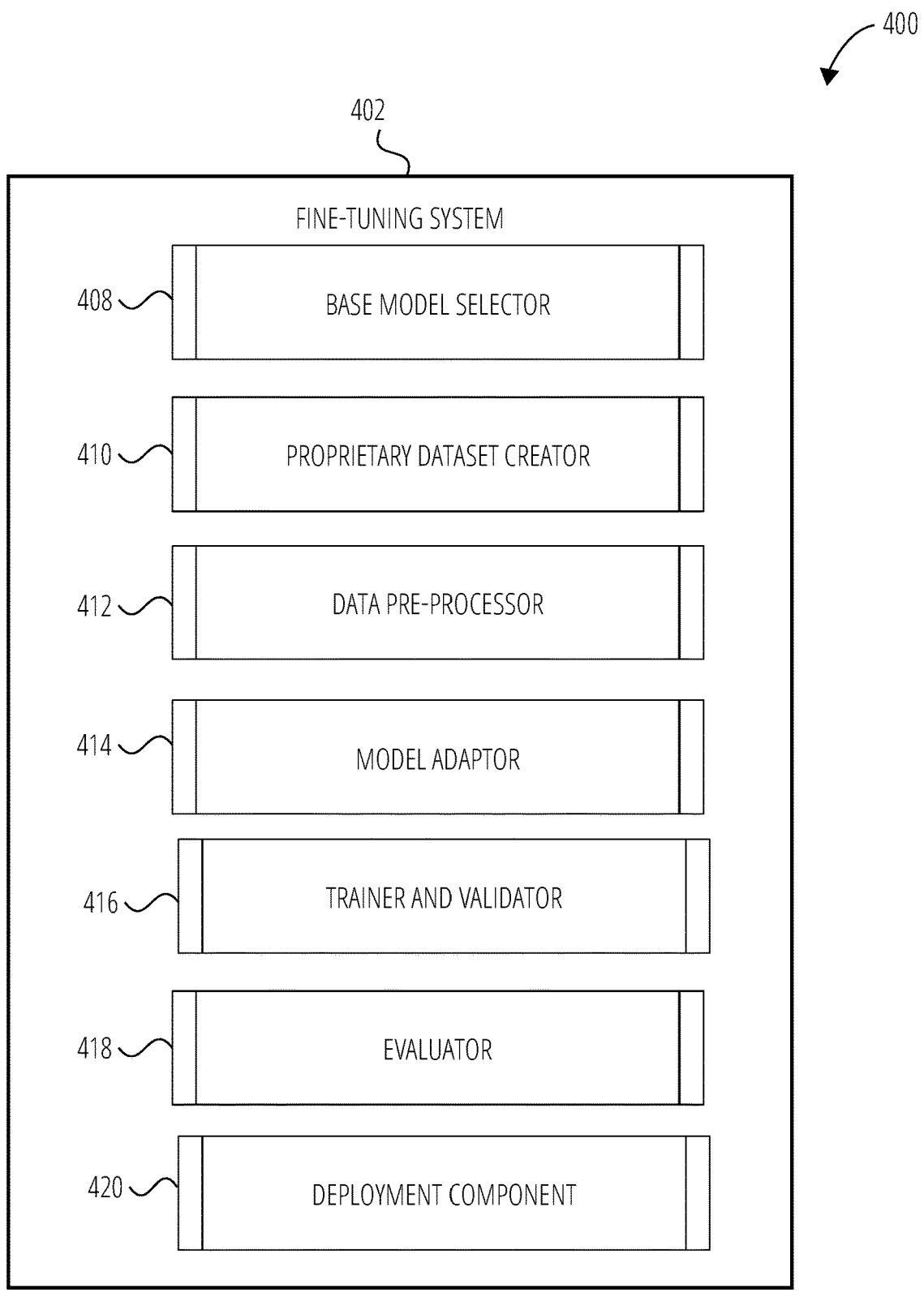
FIG. 4 is a block diagram illustrating a fine-tuning system to fine-tune a pre-trained model that is further trained on a smaller, task-specific dataset, according to some example embodiments.

FIG. 4 is an example block diagram 400 illustrating an example fine-tuning system 402 to fine-tune a pre-trained model (e.g., LLM) that is further trained on a smaller, task-specific dataset. This process allows the model to adapt its knowledge to the particularities of the desired task, in accordance with some embodiments of the present disclosure.

Example embodiments of the model training and fine-tuning system architecture disclosed herein include one or more fine-tuning processes and/or use of proprietary datasets as components in the development and deployment of machine learning models, especially for tasks (e.g., search queries, summarization, etc.) that require a high degree of specificity and accuracy. The fine-tuning system 402 includes a machine learning technique where a pre-trained model is further trained (e.g., fine-tuned) on a new dataset that is generally smaller and/or more domain-specific than the data used in the initial model training. The fine-tuning system 402 allows the model to adapt to nuances, specific requirements, or the like of the new task or domain.

The block diagram 400 illustrates components of the fine-tuning system 402, including a base model selector 408, proprietary dataset creator 410, data preprocessor 412, model adaptor 414, trainer and validator 416, evaluator 418, and deployment component 420.

The base model selector 408 of the fine-tuning system 402 begins with the selection of a large, pre-trained model that has been trained on a vast and diverse dataset. This model serves as the starting point and has already learned a rich representation of language features. For example, the fine-tuning system 402 would choose an LLM that has been pre-trained on a large and diverse corpus of data.

The proprietary dataset creator 410 enables a proprietary dataset to be created or curated, which contains examples that are closely aligned with the specific tasks the model will perform. For a search system, this might include pairs of user queries and the most relevant web page summaries. The fine-tuning system 402 collects and pre-processes a dataset that is representative of the task, where the dataset will include input-output pairs that the model will learn from. For example, proprietary datasets are specialized datasets created or acquired by an organization for a specific purpose. These datasets may or may not be publicly available and are often a key competitive advantage due to their tailored nature. Characteristics of proprietary datasets include domain-specific, high-quality annotations, diverse and representative data, privacy-compliance, continual improvement, and the like. The data is highly relevant to the domain or industry in question, containing examples and scenarios that the model is likely to encounter in production. In some examples, the dataset includes annotations or labels created by domain experts, ensuring high-quality training signals for the model. Although smaller than the datasets used for pre-training, proprietary datasets are diverse and representative enough to cover the variations and edge cases the model will face. Proprietary datasets are created with privacy considerations in mind, ensuring that any sensitive information is handled according to legal and ethical standards. As the model is used and more data is collected, the proprietary dataset can be expanded and refined to further improve the model's performance.

In the context of the search system, the proprietary dataset would likely include a wide range of user queries, corresponding web pages, and expert-generated summaries of those pages. Additional details on summarization techniques and web-answer generation models as used herein are in patent application entitled, "Enhanced Search Result Generation Using Multi-Document Summarization," filed concurrently on Feb. 16, 2024, U.S. patent application Ser. No. 18/443,838, hereby incorporated by reference in its entirety.

The dataset might also contain user feedback on the quality of the search results, which can be used to further fine-tune the model's performance. By fine-tuning pre-trained models on such proprietary datasets, the search system can achieve a high level of accuracy and efficiency in providing users with relevant and concise summaries, thereby enhancing the overall search experience.

Next, the fine-tuning system 402 includes a data preprocessor 412 in which the proprietary dataset is preprocessed to match the format expected by the base model. This may involve tokenization, normalization, and other processing steps.

The model adaptor 414, when necessary or desired, is implemented to modify the model's architecture to suit the task. For example, this might involve adding task-specific layers, such as a classification layer for sentiment analysis or the like. The model adaptor 414 takes the base model and adapts it to the new task. This involves modifying the model's architecture if necessary, such as adding or adjusting layers that are specific to the summarization task.

The trainer and validator 416 are used to fine-tune the model by training the model on the proprietary dataset, with parameters being adjusted based on the performance on a validation set. This iterative process continues until the model achieves satisfactory performance on the validation metrics. For example, this may include initializing pre-trained weights to leverage its pre-existing language understanding, continue training the model including updating the model's weights to minimize the loss function defined for the task, and/or hyperparameter tuning to adjust hyperparameters (e.g., learning rate, number of epochs, batch size, etc.).

The evaluator 418 is used to evaluate the fine-tuned model using a separate test set from the proprietary dataset to ensure that it generalizes well to unseen data. In some examples, regularization and/or optimization techniques may further be used to optimize the task-specific model. The evaluator 418 is used to quantize the trained fine-tuned model through a symmetric quantization method that quantizes both weights and activations to signed integers, thereby reducing a size of the trained fine-tuned model, and improving latency of the trained neural network without degrading accuracy.

Examples of the evaluator 418 can further use asymmetric compression to reduce the size of the trained model. The deployment component 420 of the fine-tuning system 402 is then used once the model meets the desired performance criteria, it is deployed as part of a system, such as the machine learning model fine-tuning system, where it can process real user queries using the fine-tuned, task-specific models.

Example embodiments of the fine-tuning system 402 provide for fine-tuning that allows the LLM to maintain its broad linguistic capabilities while specializing in the nuances and requirements of a particular task, resulting in a task-specific model that can perform with high accuracy and efficiency. For example, the large language models 304 can be fine-tuned on a summarization-specific dataset to perform both extractive summarization (e.g., where the model selects and combines sentences from the original text) and abstractive summarization (e.g., where the model generates new sentences that capture the essence of the original text). The choice of model often depends on the specific requirements of the summarization task, such as the desired length of the summary, the domain of the text, and the computational resources available.

Figure 5:
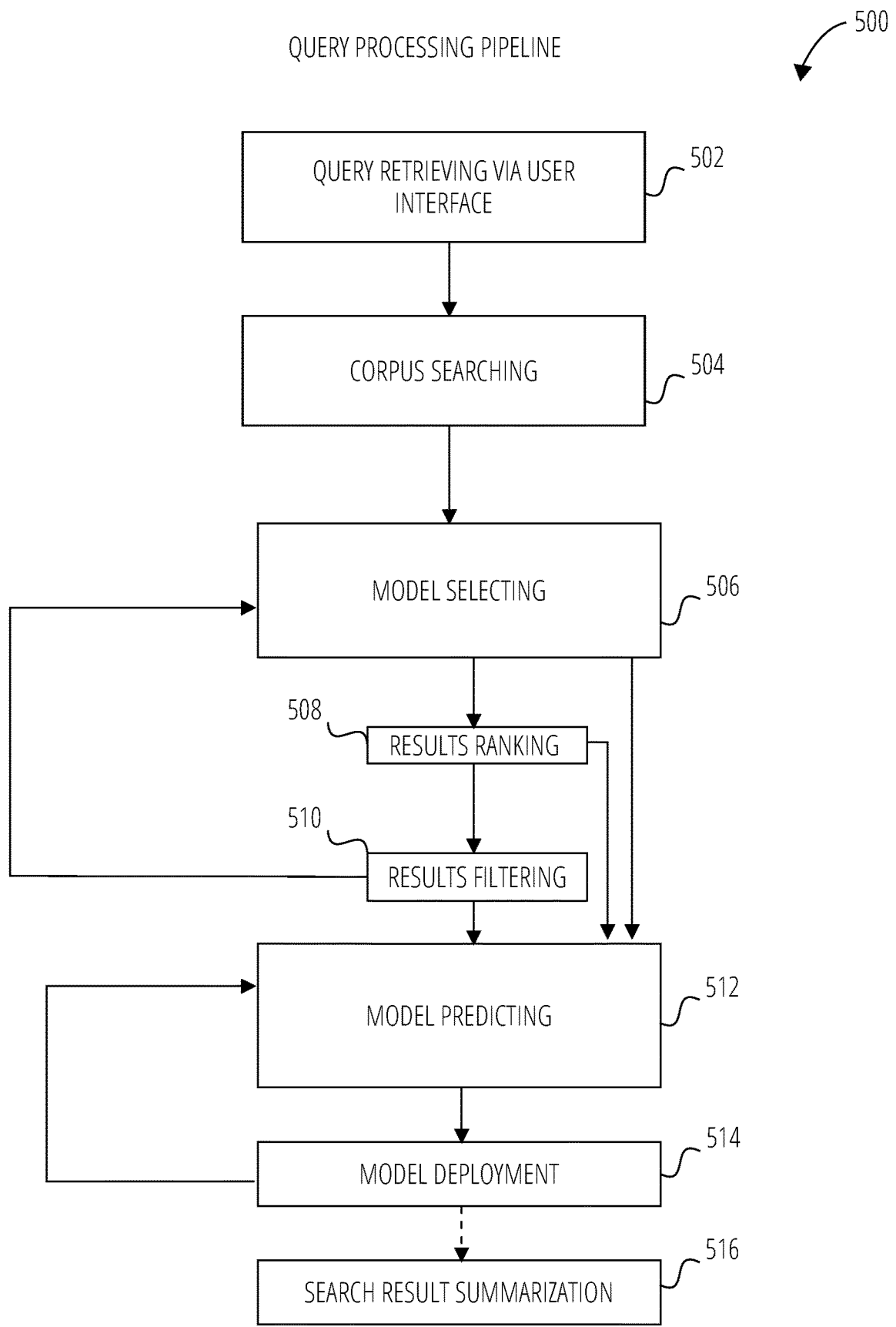
FIG. 5 is a query processing pipeline illustrating selection and use of one or more machine-learning programs, according to some example embodiments.

FIG. 5 depicts a query processing pipeline 500 that illustrates selection and use of one or more machine-learning programs (e.g., LLMs, task-specific models, etc.), in accordance with some example embodiments. Specifically, FIG. 5 is a flowchart depicting a query processing pipeline 500 for model deployment, according to some examples. The query processing pipeline 500 can be used to generate a trained model to perform operations associated with user required tasks, for example and not limitation, for searches and query responses.

Broadly, examples of the query processing pipeline 500 include an initial stage of the query processing pipeline that involves query retrieving via user interface 502 (e.g., the reception of a user query via a web browser), which is submitted through a designated search interface. This interface is designed to capture user input and transmit the query to the system for further processing. Upon receiving the user query, the system initiates a corpus search operation or corpus searching 504. This process involves querying a pre-constructed corpus index, which contains indexed information from a collection of documents. The search mechanism is configured to retrieve a number of results (e.g., the top fifteen results) that are most relevant to the user's query. The relevance of these results is determined by a set of predefined algorithm(s), which rank the documents based on their pertinence to the input query. The query processing pipeline 500 includes model selecting 506, which includes the system(s) described throughout, selecting one or more models (e.g., large language models, task-oriented models, etc.) to be used to perform one or more operations on the search query.

Subsequent to the initial retrieval, the query processing pipeline 500 continues to the result ranking 508 phase that employs additional machine learning (ML) models to refine the ranking of the search results. These models take into account various factors, including but not limited to the authority of the source, the freshness of the content, and other relevance signals. The application of these ML models ensures that the final ranking of the results aligns more closely with the user's search intent and the quality of the content. In some examples, the results ranking 508 phase can include an initial ranking model and a machine learning ranking model, such as a neural ranking model to take the query and retrieve documents as input and output a relevance score. The machine learning ranking model can be trained on historical search query data and is optimized for relevance to user's search intent.

The query processing pipeline 500 continues with a filtering stage that is responsible for the removal of any irrelevant or problematic results from the set of retrieved documents. This process is used for enhancing the quality of the search results presented to the user, ensuring that the output is free from content that does not meet the system's quality standards or relevance criteria. For example, the results filtering 510 phase can include rule-base filters to filter for unsuitable categories (e.g., user restricted, adult content, etc.) and/or remove duplicate content. The results filtering 510 phase can also include a machine learning filter to classify low quality documents (e.g., spam, auto-generated content, etc.) and/or train on human-labeled quality judgments. According to some examples, the results filtering 510 phase of the query processing pipeline 500 returns back to the model selecting 506 phase for further refinement. In additional examples, the model selecting 506 phase bypasses the results ranking 508 and/or the results filtering 510 phase and moves directly to a model predicting 512 phase (e.g., model prediction).

The model predicting 512 phase includes using a trained model (e.g., trained machine-learning program) to generate predictions on new, unseen data without user involvement (e.g., without further user input) or with user involvement (e.g., with further user input). The model deployment 514 phase can include a phase for integrating the trained model (e.g., the trained machine-learning program) into a more extensive system or application, such as a web service, mobile app, or IoT device. This phase can involve setting up APIs, building a user interface, and ensuring that the model is scalable and can handle large volumes of data. The model deployment 514 phase provides output (e.g., results) to the user's query in the browser-based interface, without a new webpage being generated.

In some examples, the final stage in the query processing pipeline 500 includes a search result summarization 516 phase, which includes enhanced search results generation using multi-document summarization of the individual search results. Each document within the result set is processed by per-document models that generate concise summaries of the content. Additionally, a cross-document model is employed to synthesize these individual summaries, creating an aggregated summary that captures the essence of the top results. This summarization process facilitates a quick and efficient understanding of the search results by the user, allowing for rapid assimilation of information, where each individual document is cited within the summary and presented to the user in the browser-based interface, without a new webpage being generated.

Figure 6:
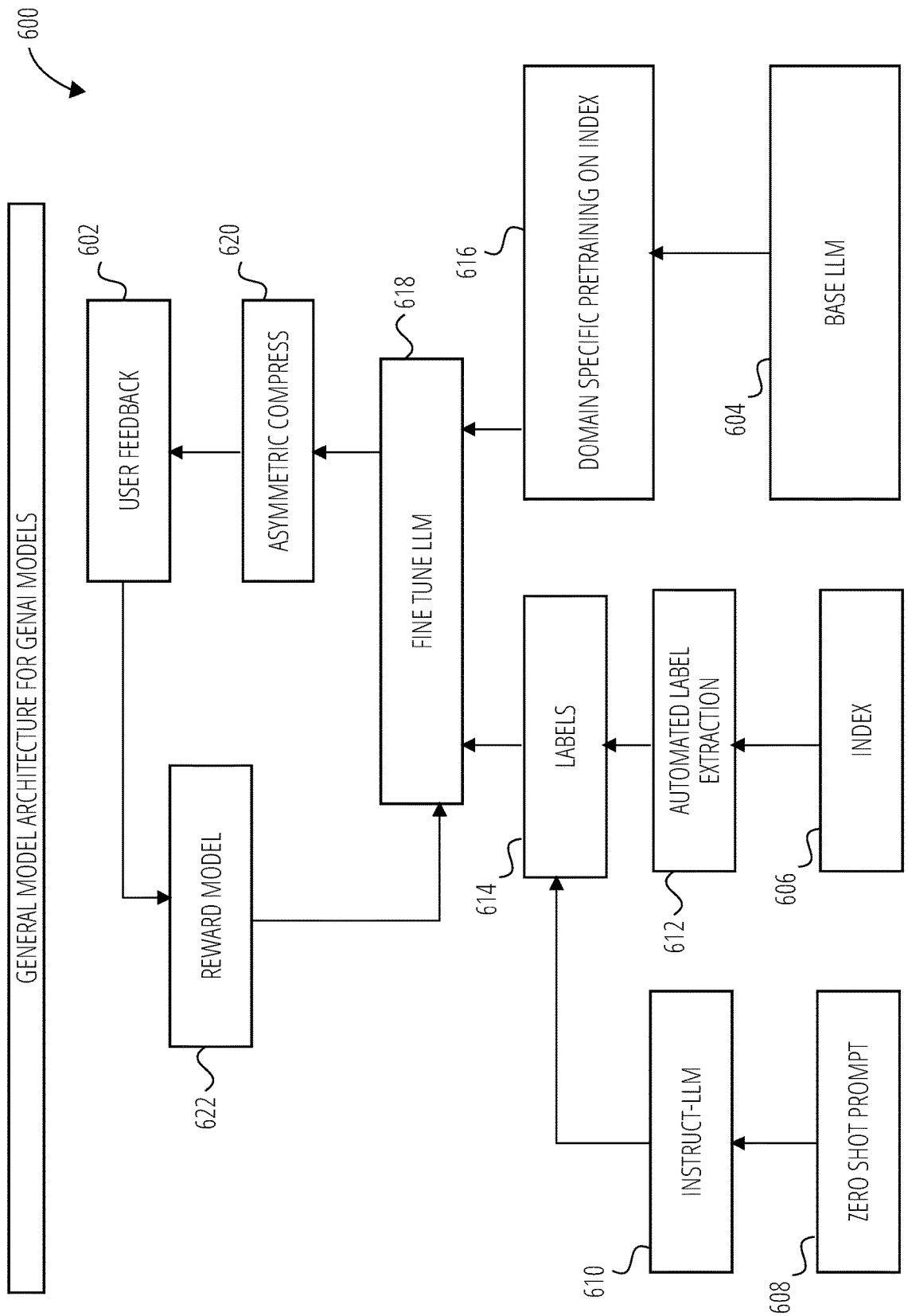
FIG. 6 illustrates a model architecture illustrating generative artificial intelligence model selection and use of one or more machine-learning programs, according to some example embodiments.

FIG. 6 depicts a general model architecture 600 for generative artificial intelligence models that illustrates selection and use of one or more machine-learning programs (e.g., LLMs, task-specific models, etc.), in accordance with some example embodiments.

The model architecture 600 comprises a user feedback 602 component, a base LLM 604 component, an index 606, a zero shot prompt 608 component, an instruct-LLM 610 component, an automated label extraction 612 component, labels 614, domain specific pretraining on index 616 component, a fine tune LLM 618 component, an asymmetric compress 620 component, and a reward model 622 component. The various components include processes that are part of the model architecture 600 for developing, training, and deploying LLMs for various tasks, with the goal of creating models that can understand and generate human-like output.

The base LLM 604 component includes one or more foundational, pre-trained large language model(s) that serve as a starting point for further fine-tuning or specialization. This initial model has been pre-trained on a large corpus of data using learning techniques and is designed to understand and generate natural language patterns, structures, semantics, and the like from a training dataset. The base LLM 604 component can send the base model to the domain-specific pre-training on the index 616 component to pre-train the base model on a dataset (e.g., index 606) that is specific to a particular field, domain, or other subject.

According to examples, after the base LLM is pre-trained, the domain specific pretraining 616 component can perform additional pre-training on a dataset that is specific to a particular domain or industry (e.g., legal documents, medical journals, technical manuals, etc.). The domain-specific pre-training is designed to adapt the general language understanding of the base model to the nuances, terminology, and style of the target domain. For example, domain-specific pretraining helps the model become more familiar with the context and content it will encounter in specialized applications. The domain specific pretraining on index 616 component helps the base model to better understand and generate content that is relevant to the domain, and once pre-trained, it is forwarded to the fine tune LLM 618 component. In other examples, the base LLM can be sent directly to be fine-tuned via the fine tune LLM 618 component. The fine tune LLM 618 component also receives additional information from the labels 614 component, including data that is used to tell the model the desired output for a given input (e.g., labels are used in supervised learning to train the model to recognize the correct response or categorization for inputs). Quality can be measured using a percentage of the correct search response.

In some examples, the labels 614 component receives information from multiple sources, such as the index 606, the automated label extraction 612 component, the zero-shot prompt 608 component, and the instruct-LLM 610 component. For example, and in no particular order, the index 606 can include a dataset organized for efficient retrieval of information to find relevant results. The index 606 can include a vast repository of information (e.g., webpages, documents, etc.) that it can use to inform its outputs. For example, the index 606 can consist of pre-processed and structured data that the model can query to generate responses or to understand context better. In additional examples, the index 606 can include unstructured data or the like. The index 606 provides some or all data to the automated label extraction 612 component, which processes where the model automatically generates labels for training data (e.g., to create annotations for a dataset for further fine-tuning of the model). Once processed, information is sent from the automated label extraction 612 component to the labels 614 component.

In some examples, the zero-shot prompt 608 component provides for tasks to be completed without any fine-tuning or training specifically for that task. For example, the model is given a prompt or instruction and simply generates a response based on its pre-trained knowledge. This generated response can be sent to the instruct-LLM 610 component, which provides a model that has been trained or tuned to follow instructions given (e.g., natural language instructions). The generated response, once following given instructions, is then provided to the labels 614 component.

According to examples, the labels 614 component data is provided to the fine tune LLM 618 component. The fine tune LLM 618 component includes a model, after pre-training has been performed, being fine-tuned on a more specific dataset or task. For example, the fine-tuning process can adjust the weights of the model to perform better on the desired outputs. Examples of the fine tune LLM 618 component provide for a fine-tuning process to adjust the model's parameters on a more narrowly defined dataset, often with labeled examples, to perform a specific task (e.g., question answering, sentiment analysis). In some examples, fine-tuning can be more focused than domain-specific pre-training and often involves training on data that includes the specific inputs and outputs desired for the task. For example, fine-tuning allows the model to apply its broad language capabilities and domain knowledge to achieve high performance on the task it is being trained for.

Once the model has been fine-tuned, the fine tune LLM 618 component sends the fine-tuned model to the asymmetric compress 620 component, which provides a method of model compression that reduces the size of the model (e.g., reduces computational resources, requirements, latency, etc.) without significantly impacting performance (e.g., identified loss of performance, degrading performance, etc.). To reduce the model's size and improve inference speed, techniques like quantization or pruning are used. These methods reduce the precision of the model's parameters or remove less important parameters while preserving performance. Examples of asymmetric compression may include knowledge distillation, pruning, quantization, or the like. Once compressed, the task-specific model is provided to the user feedback 602 component to improve the model's performance using explicit and/or implicit or other feedback to be incorporated into the training process to further fine-tune the model. A model may incorporate user feedback to refine its predictions. In additional examples, the user feedback can be direct feedback on the output or indirect feedback inferred from user interactions with the system. The user feedback, if applied, is provided to the reward model 622 component for further fine-tuning, where different attributes (e.g., fluency, etc.) are selected along which to perform the reward modeling. The reward model is further described and depicted in connection with FIG. 7. The reward model 622 component provides details back to the fine tune LLM 618 component in an iterative manner until the fine-tuned model is at a preferred (e.g., optimal, standardized, identified, etc.) level of optimization.

Figure 7:
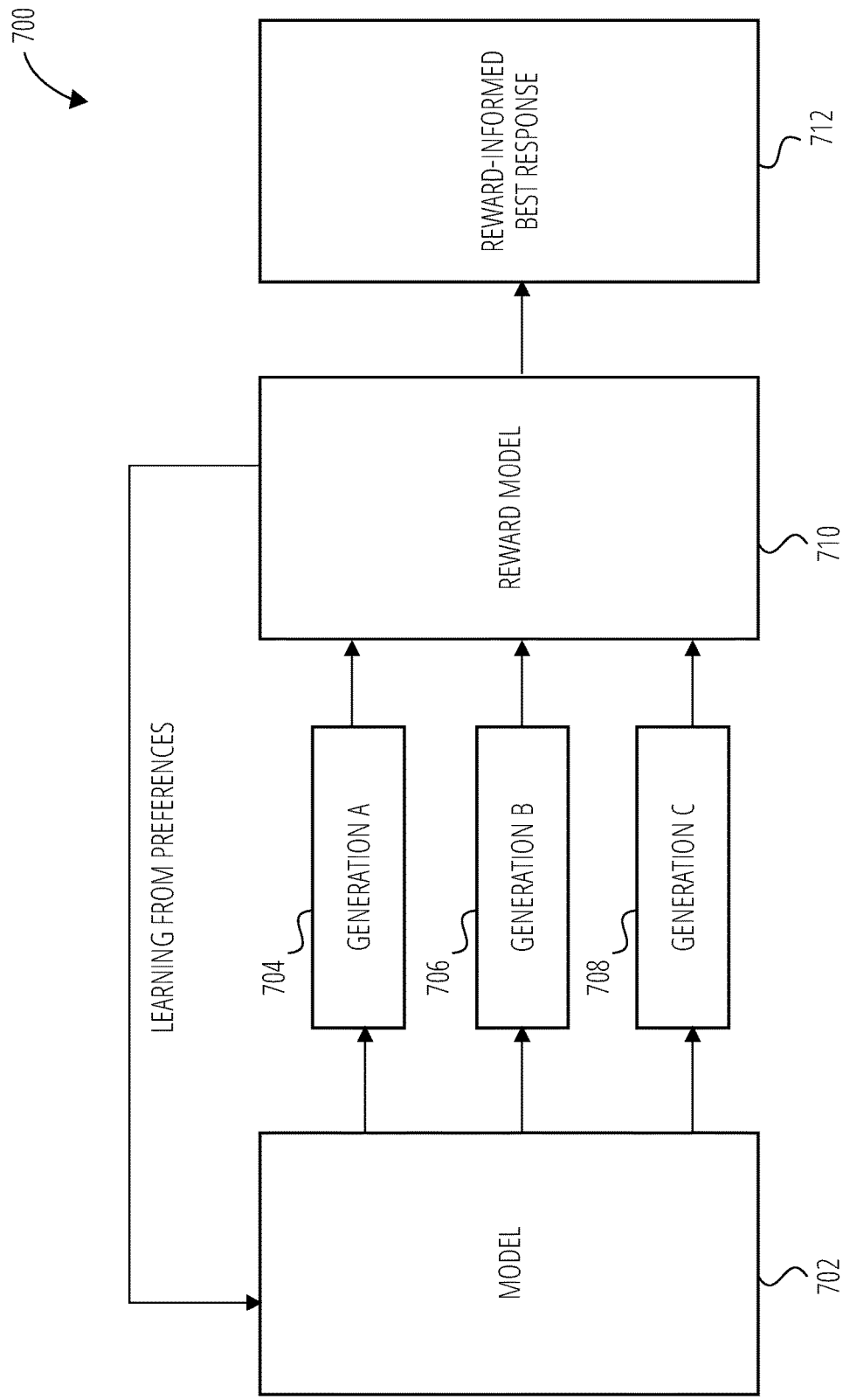
FIG. 7 illustrates a general model architecture for generating models according to reward modeling, according to some example embodiments.

FIG. 7 depicts a block diagram 700 illustrating a general model architecture for generating models according to reward modeling, in accordance with some example embodiments. Specifically, the block diagram 700 illustrates model generation according to learning from preferences.

The block diagram 700 includes abase model 702 producing multiple output generations, such as generation A 704, generation B 706, and generation C 708, in response to a user query (where any number of output generations can be generated). The multitude of output generations are provided to a reward model 710 in order to train the reward model 710 based on a prompt/response pair as input and providing a scalar (e.g., a single numerical value that represents a score or value assigned to a particular output or prediction) as output to provide the reward-informed best response 712 to the user query. The reward model 710 can provide feedback in an iterative manner back to the model 702 in order to learn from user preferences. According to examples, reward modeling can be used in conjunction with LLMs to generate fine-tuning data with highest reward, use rejection sampling to pick between samples, and/or to directly optimize a model using reinforcement learning.

According to additional example embodiments, the fine-tuning system trains a reward model that takes as input a (prompt, response) pair, and provides as output a scalar representing how fluent (or other parameter) the response is given based on the prompt. In some examples, Reinforcement Learning from Human Feedback (RLHF) can be used to train a model. RLHF is a machine learning technique that involves training a reinforcement learning (RL) model using feedback provided by humans. This approach is used to guide the learning process of the model, especially in complex environments where predefined reward functions are difficult to specify or may not capture all aspects of the desired behavior. In RLHF, human feedback can come in various forms, such as, demonstrations (e.g., humans perform the task themselves, and the model learns from these demonstrations), preferences (e.g., humans provide feedback on which of two or more model-generated outcomes they prefer), corrections (e.g., humans correct the model's actions or suggest better ones), evaluations (e.g., humans provide a score or evaluation of the model's actions or behavior), and the like. One goal of RLHF is to align the model's behavior with human values and intentions, making it more useful, safe, and reliable for practical applications.

Example embodiments of the fine-tuning system disclosed herein employs RLHF without any human feedback to improve difficult-to-quantify generative outcomes (e.g., the fluency of a summarization task using task-specific generative model system). According to examples, fine-tuning the RL algorithm by training a generative task-specific model can increase the outcome from four to ten percent, for example. For example, such fine-tuning can consist, in some examples, of taking a fuzzy quality (e.g., fluency) and improve the fuzzy quality using RLHF, using a transformer model (e.g., GPT-4) for generating preferences to replace human preferences based on prompts, train a reward model on the GPT-4 preferences, which can produce scores that are correlated with human judgment, tame the RLHF algorithm to optimize the generative model with regard to the reward model using different libraries (e.g., RL4LMs, TRLX, DeepSpeedChatby MICROSOFT, etc.) with different hyperparameters, and the like. According to examples, by evaluating generative outputs, the machine learning model fine-tuning system can adjust hyperparameters in order to better train different task-specific generative models to improve output.

As reward modeling can be sensitive to hyperparameters, examples of the machine learning model fine-tuning system balance the trade-offs between exploration and exploitation, stability, speed of learning, accuracy of a value function estimation, and other hyperparameters by tuning different hyperparameters to achieve wanted performance in a given task. In one example, hyperparameters Kullback-Leibler Coefficient (KL Coefficient), Target KL Divergence (Target KL), and/or Value Function Coefficient can be tuned, scaled, and/or modified to maximize or minimize different outcomes.

Example embodiments of the fine-tuning system employ the RLHF paradigm as a method for improving text generation model outputs using reinforcement learning in which the reward model used approximates for human judgments. The RLHF paradigm according to examples include the steps of: supervised fine-tuning (SFT) (e.g., fine-tune a model on input and output pairs using standard supervised learning setup), human annotation (e.g., define an annotation scheme for a particular aspect of the model's generations wanted to improve and collect human preference labels on input pairs/batches), reward modeling (e.g., fit a reward model to human preferences, where the model outputs a scalar for each input/output pair, and the loss function teaches the model to output a higher score for the preferred response in each pair of responses), and RL (e.g., running RL using the trained reward model to teach the original sequence generation (base) model to maximize mean reward to be a good reflection of human preferences. In some examples, the RL stage can be implemented using a proximal policy optimization (PPO) algorithm or the like.

According to some examples, the RL modeling method whose simplest setting treats a task as an agent interacting with the world in which the following assumptions hold: (1) the world is modeled as a set of states, (2) in each time step, the agent exists in a single state ($S\_t$), (3) in each time step, the agent takes a single action ($A\_t$), (4) in the next time step, the agent receives a scalar reward ($R\_\{t+1\}$) and finds itself in state ($S\_\{t+1\}$), (5) the Markov property holds the distribution over ($R\_\{t+1\}$, $S\_\{t+1\}$) only depends on ($S\_t$, $A\_t$), and (6) the agent's behavior is episodic (it eventually ends in a terminal state (end of the episode) after a finite number of actions. Where "S" is "state," "A" is "action," "R" is "reward," and "t" is "time step." Each agent's behavior is dictated by a policy, such as a probability distribution over possible actions conditioned on the agent's current state. The goal of such an example is to learn a policy that maximizes the sum of rewards ("return") obtained by the agent. For example, the sum can be (set gamma=1).

According to examples using a reinforcement learning (RL) model for Natural Language Processing (NLP), text generation can be framed as an RL problem with the following characteristics: (1) the agent ("A") is the LLM, (2) the state ("S") is the prompt plus a sequence of tokens that has been generated at a certain point, (3) at each time step, the action taken by the model is the generation of a token, possible the end-of-sequence token (denoted by </s>); if </s> is generated, the agent (LLM) has reach the end of the episode, (4) the probability distribution (R_{t+1}, S_{t+1}) is defined as follows: (a) if the token generated does not equal </s>, then R_{t+1}=0 and S_{t+1}=S_t+token generated, (b) if the token generated does equal </s>, then: (i) R_{t+1} equals some measure of overall quality of the full model output (e.g., fluency, harmlessness, etc.) and (ii) S_{t+1} equals the terminal state.

Additional examples of RLHF can be performed in multiple stages, and using reward modeling can be performed in other ways than simply fine-tuning the RL algorithm. For example, reward modeling can further include applying rejection sampling to output the best of n samples at inference time, fine-tuning a model on its own rejection-sampled outputs, fine-tuning a model with a reward model-ranked ladder loss on sample batches, and the like.

Figure 8:
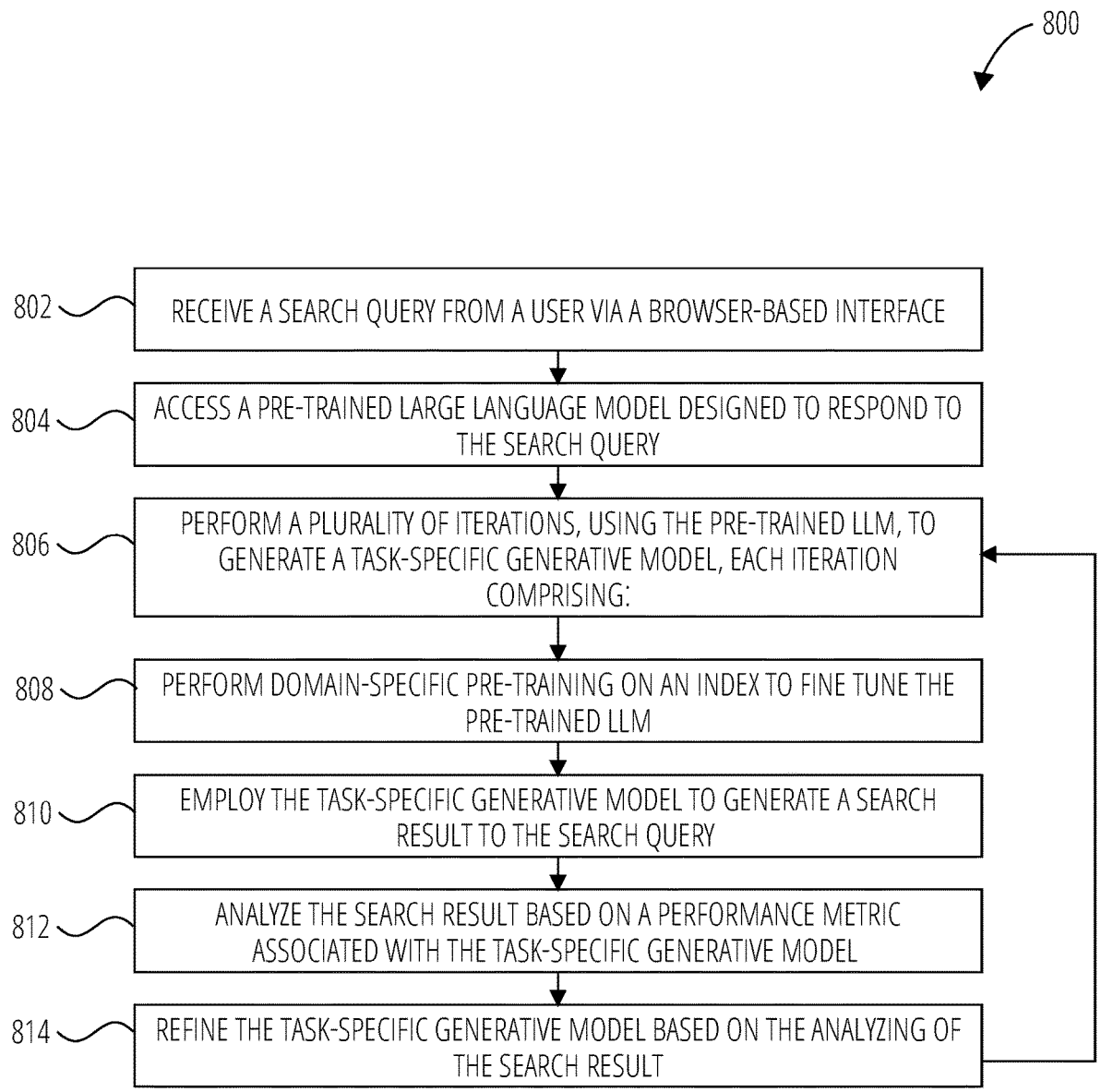
FIG. 8 illustrates a method for generating a task-specific generative model, according to some example embodiments.

FIG. 8 illustrates a flow diagram of a method 800 for generating a task-specific generative model, in accordance with some example embodiments. The method 800 can be embodied in machine-readable instructions for execution by one or more hardware components (e.g., one or more processors, one or more hardware processors, at least one hardware processor, etc.) such that the operations of the method 800 can be performed by components of the systems depicted in FIG. 1, FIG. 2, and/or FIG. 16, such as a web browser 142 of the user device 104 or the machine learning model fine-tuning system 106 or component thereof. Accordingly, the method 800 is described below, by way of example with reference to components of the machine learning model fine-tuning system 106. However, it shall be appreciated that method 800 can be deployed on various other hardware configurations and is not intended to be limited to deployment within the hardware of examples presented herein.

Depending on the example embodiment, an operation of the method 800 can be repeated in different ways or involve intervening operations not shown. Though the operations of the method 800 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

In block 802, the method 800, via the machine learning model fine-tuning system, receives a search query from a user via a browser-based interface. In block 804, the machine learning model fine-tuning system accesses a pre-trained large language model designed to respond to the search query. In block 806, the machine learning model fine-tuning system performs a plurality of iterations, using the pre-trained LLM, to generate a task-specific generative model, each iteration comprising additional elements in blocks 808-814.

In block 808, the machine learning model fine-tuning system performs domain-specific pre-training on an index to fine tune the pre-trained LLM. In block 810, the machine learning model fine-tuning system employs the task-specific generative model to generate a search result to the search query. For example, an example of a task specific model such as a web-page specific summarization system such as described in the "Enhanced Search Result Generation Using Multi-Document Summarization," patent application incorporated by reference in its entirety.

In block 812, the machine learning model fine-tuning system analyzes the search result based on a performance metric associated with the task-specific generative model. For example, performance metrics can include precision, recall, F1 score, fluency, speed, accuracy, user satisfaction ratings, or the like. Examples of the method may include the model's output being evaluated against specific metrics relevant to a specific task. For example, the model is iteratively updated to improve these metrics, which could involve adjusting weights, biases, or learning rates. Returning to method 800, in block 814, the machine learning model fine-tuning system refines the task-specific generative model based on the analyzing of the search result.

In certain embodiments, the user can select source types, source trust values (e.g., including quantitative values, such as a trust index value on a slider bar, and/or qualitative values such as categories of sources to include or exclude), or the like, where the single answer may be updated; for example, by refreshing the answer and/or modifying the answer in real time.

An example embodiment allows the user to select various user information and/or preferences, such as: an answer format; source types to include or exclude; trust levels of sources to be utilized; treatment of machine generated content versus user generated content; document types (e.g., white papers, journal articles, news articles, opinion articles, peer reviewed sources, etc.); formality of the answer (e.g., reading level of the answer, utilization of formatting techniques, utilization of complete sentences, etc.); and/or certainty ratings for the answer (e.g., level of speculative content allowed, correlation or agreement with other sources on factual information).

In certain embodiments, system level filters or other adjustments may be applied to all searches, utilized as default parameters for users that have not set those aspects, and/or may be applied according to the user type, classifications of the user and/or search query, intents of the user and/or search query, and/or according to the user context. Example system level filters and/or other adjustments include, without limitation: limiting results to trusted sources; adjusting source trust levels (e.g., according to search topic, indicated intents, etc., for example a given website may be high trust for retail sales data, but low trust for thermodynamic data); based on the user trajectory or search path, and/or scoped according to a session; based on classification of the search (e.g., noting that multiple histories might be available, and classifications for the search may not be on the same axis, such as search topic, type of search (e.g., casual, work, academic, etc.), a new versus a mature search, etc.); application of multiple trust values and/or classifications for a source (e.g., based on topic, type of information (e.g., analysis versus raw data; fact versus opinion; user-generated element versus machine generated element, etc.); and/or adjusted over time (e.g., based on ranking updates, offset user activity, user responsiveness to search results, etc.).

Figure 9:
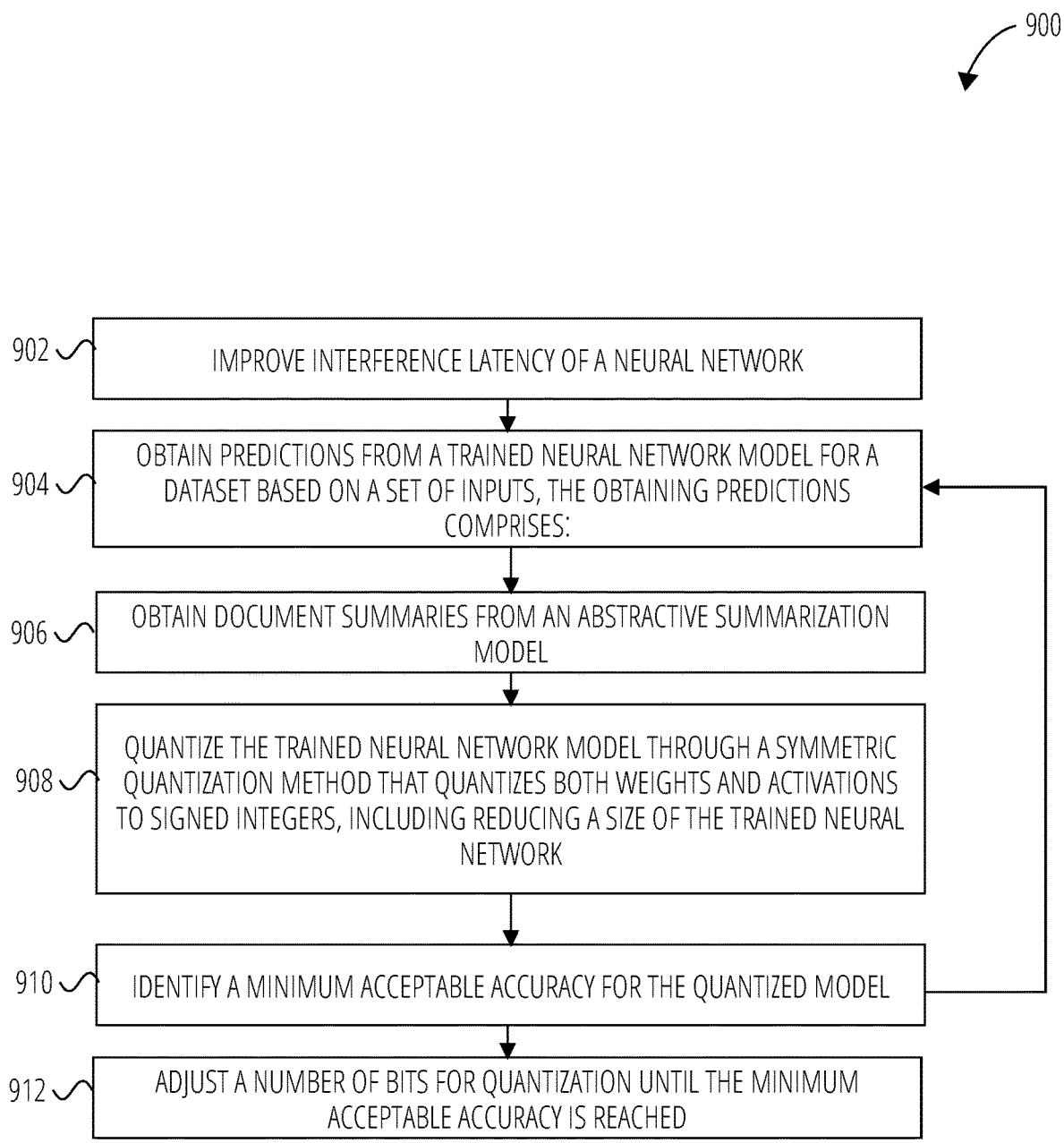
FIG. 9 illustrates a method for improving interference latency of a neural network, according to some example embodiments.

FIG. 9 illustrates a flow diagram of a method 900 for improving interference latency of a neural network, in accordance with some example embodiments. The method 900 can be embodied in machine-readable instructions for execution by one or more hardware components (e.g., one or more processors, one or more hardware processors, at least one hardware processor, etc.) such that the operations of the method 900 can be performed by components of the systems depicted in FIG. 1, FIG. 2, and/or FIG. 16, such as a web browser 142 of the user device 104 or the machine learning model fine-tuning system 106 or component thereof. Accordingly, the method 900 is described below, by way of example with reference to components of the machine learning model fine-tuning system 106. However, it shall be appreciated that method 900 can be deployed on various other hardware configurations and is not intended to be limited to deployment within the hardware of examples presented herein.

Depending on the example embodiment, an operation of the method 900 can be repeated in different ways or involve intervening operations not shown. Though the operations of the method 900 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined, or omitted, or be executed in parallel.

At operation 902, the machine learning model fine-tuning system 106 improves, by one or more hardware processors, interference latency of a neural network. At operation 904, the machine learning model fine-tuning system 106 obtains predictions from a trained neural network model for a dataset based on a set of inputs, the obtaining predictions from the trained neural network model comprises additional elements in blocks 906/908/910.

At operation 906, the machine learning model fine-tuning system 106 obtains document summaries from an abstractive summarization model. At operation 908, the machine learning model fine-tuning system 106 quantizes the trained neural network model through a symmetric quantization method that quantizes both weights and activations to signed integers, the quantizing of the trained neural network reducing a size of the trained neural network and improving latency of the trained neural network without degrading accuracy. At operation 910, the machine learning model fine-tuning system 106 identifies a minimum acceptable accuracy for the quantized model.

At operation 912, the machine learning model fine-tuning system 106 adjusts a number of bits for quantization until the minimum acceptable accuracy is reached.

Figure 10:
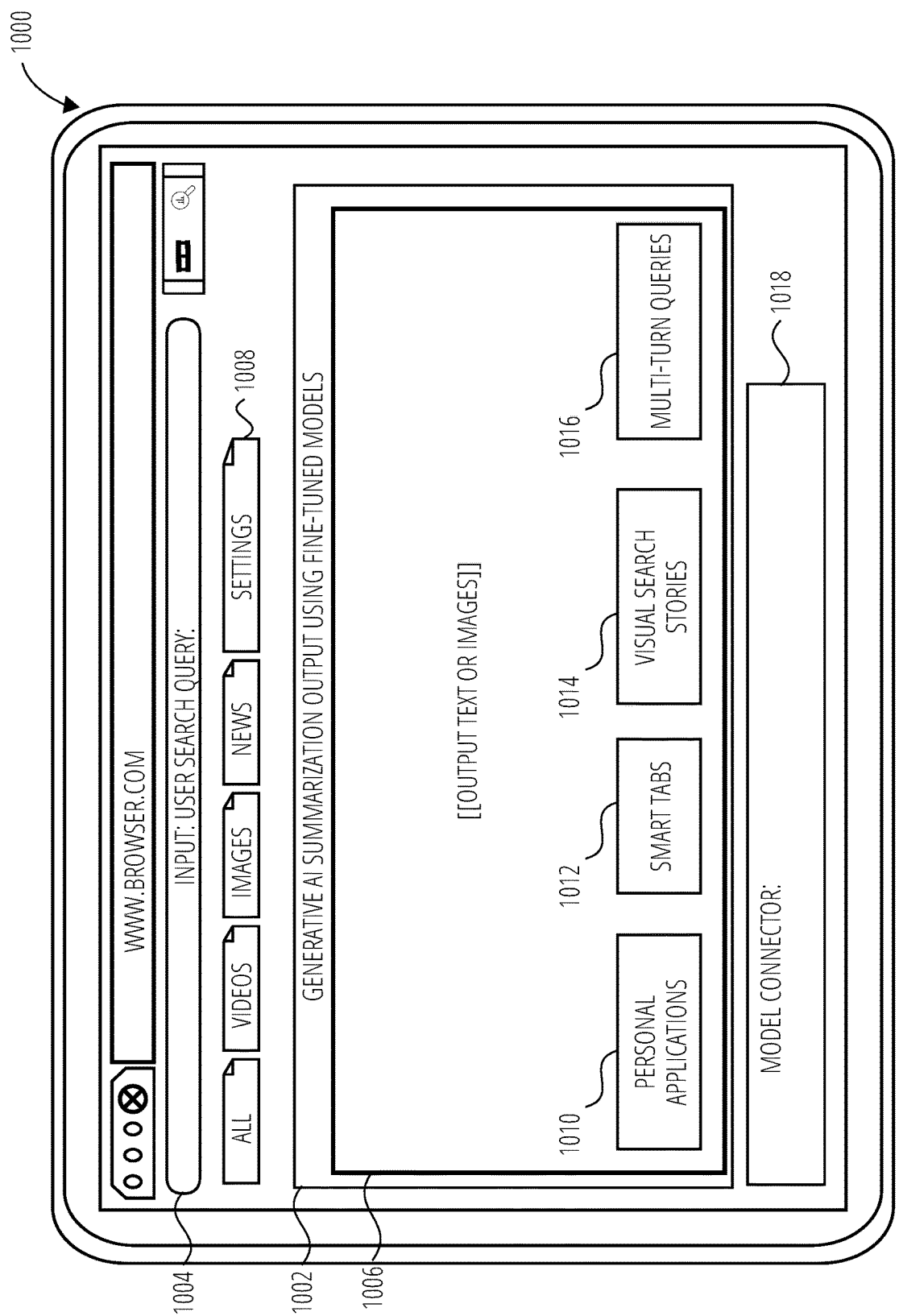
FIG. 10 illustrates a user interface implementation of the machine learning model fine-tuning system presented on a browser of a user's user device, according to some example embodiments.

FIG. 10 is an example user interface 1000 illustrating an example implementation of the machine learning model fine-tuning system 106 presented on a browser of a user's device, in accordance with some embodiments of the present disclosure.

Specifically, the user interface 1000 shows a user's browser including a user input box to receive input 1004 (e.g., a user's query) to be answered by the machine learning model fine-tuning system 106; for example, the system can perform a task and provide generative AI summarization output using fine-tuned models 1002.

The user interface 1000 provides for AI searching that receives fresh answers generated from most relevant sources in real-time in the browser-based user interface 1006. The browser-based user interface 1006 provides for interactive, real-time user feedback to report problems (e.g., stale data, outdated information, confusion, nonsensical output, etc.), as well as providing community feedback to improve output. The answers and discoveries for queries can be answered by the system in expected and familiar structures (e.g., commercial queries, buying options, pros/cons, generated comparisons, etc.).

The user interface 1000 further provides for multi-turn queries 1016 generated in real time within the same browser-based user interface 1006, which can include a conversational mode immersed with minimal navigational context. The user interface 1000 also includes settings 1008, which allows for user control to customize results that reflect the provider selections made by the user (e.g., preferred providers, languages, themes, privacy, security, and the like).

The user interface 1000 further includes AI answer and discovery through visual search stories 1014 that include minimal text and primarily images, videos, or multimedia output. Whether examples provide for text, images, or combinations thereof, the user can save results for future visits, share the results directly as the user sees the output in the browser-based user interface 1006, directly send an email to the results, or otherwise set alerts or automatic saving of results. The system enables the user to directly connect to other personal applications 1010 (e.g., email, calendar, cloud share, etc.) directly from the browser-based user interface 1006 without leaving the browser. The system provides for auto-archiving of tab management based on search results for organized smart tabs 1012. The smart tabs 1012 can be based on task-specific generative models used to organize search results across devices, sessions, and the like.

In example embodiments, various user information and/or preferences may be adjusted in real time or near real time, provided in advance, and/or may be provided according to context (e.g., time-of-day, search terms used, etc.). Various user information and/or preferences may be utilized to update search results and/or the single answer in real time. User information and/or preference adjustments may be made, for example and not limitation, by entering keywords, selecting radio buttons, using a slider bar, or the like. Additional examples provide a model connector 1018 to provide the user with the task-specific generative model(s) and/or LLMs being used to generate the output in the generative AI summarization output using fine-tuned models 1002 field of the browser. The model connector 1018 further enables the user to adjust models being used by the system by requesting, in plain language or using enhanced hyper-parameter controls, to change certain aspects about the output being received.

An example operation, for example to classify queries, determine query intents, classify sources, or the like, includes providing all relevant features in a string to perform such operations. An example operation includes combining the results into a single useful answer, including coupling elements together into a flow for the answer, ensuring grammatical correctness, and/or providing citations. An example embodiment is configured to determine the presence of machine generated content, for example within a source, and/or determining that an entire source is constituted from machine generated content (e.g., generative artificial intelligence (GenAI) content or the like). In certain embodiments, sources and/or elements thereof that are determined to be machine generated content may be flagged, allowing for rapid decisions related to the machine generated content during various operations herein. In certain embodiments, machine generated content may be deprecated (e.g., given a lower ranking, and/or disfavored versus user generated content), blocked (e.g., not utilized to formulate an answer), and/or treated according to user preferences. In example embodiments, machine generated content may be utilized directly in the same manner as other content. For example, machine generated content may be utilized in an answer, and flagged for the convenient reference of the user that the content appears to be machine generated.

According to examples, determination of potential machine generated content, and how it may be utilized or not, may be combined with other determinations, for example, the machine generated content may be utilized where it is expected that the content may be machine generated initially (e.g., reports, listings, data sets, etc.) and/or where the source is otherwise of a high quality (e.g., provided by a university or expert in the field of the query) and would be expected to be correct. In examples, responses of users over time to certain machine generated content elements may be utilized to determine whether the machine generated content should be used or not, for example based on responses of users to searches including the content. The detection, flagging, and/or management of machine generated content can avoid recursive information loops, where the machine generated content is not a primary source of information but effectively gets used as such, while still allowing the use of the content where it would be helpful to specific users for specific purposes.

In example embodiments, some types of user generated content are treated with additional care and management. For example, discussion threads, REDDIT sources, QUORA sources, or the like, may include good sourcing information as answers for certain query types. However, user generated content sources such as these can be subject to thread drift, off-topic discussion, and/or repetition that may inflate the weight of the source. Accordingly, embodiments herein may be configured to parse and/or classify such user generated content, for example to identify (and/or exclude) off-topic content, to tune the weighting of the source appropriately, to identify content that may be valuable for some purpose other than the thread topic (e.g., capturing a good description of bat echo-location provided off-topic in a thread about whales), or the like. Portions of such content may be treated as separate standalone sources, at least for determinations of relevant sources, source ranking against the search query, or the like. Determinations of trust values, ranking, and/or classification may further include considerations of the user (e.g., which REDDIT user provided content), the source (e.g., REDDIT, QUORA, WIKIPEDIA discussion page, internal discussion page for a company, etc.), the topic (e.g., an on-topic comment may be given a higher ranking than an off-topic comment), query type (e.g., a casual intent query may drive a different parsing and/or treatment for such content relative to an academic intent query), the history of the specific user with such content, a classification of the user, meta-data from the source (e.g., number of likes, dislikes, reports, etc. associated with a comment), and/or a combination of these (e.g., User A commenting on Thread B is treated as source AB, and user A commenting on Thread C is treated as source AC, embodying the potential differential ranking of that user by topic, etc.).

In example embodiments, content may have an adjusted ranking, relevance, trust level, etc., based on the information type and/or age of the information. For example, a source dated before a new scientific discovery may be rated lower than a source dated after the scientific discovery, where the topic of the search query relates to that scientific discovery. Without limitation, other aging data types include news or current events, financial information, politics, etc. Metadata changes over time may be considered as well, for example where content is recently edited, where a ratio of likes/dislikes changes after a relevant event (e.g., content about a company that receives a large number of dislikes after the company reports financial data may be an indicator that the trust level of that content has changed). Source information that is likely to be time sensitive may be flagged, determined according to classification information, determined by an inflection in responses, etc.

Figure 11:
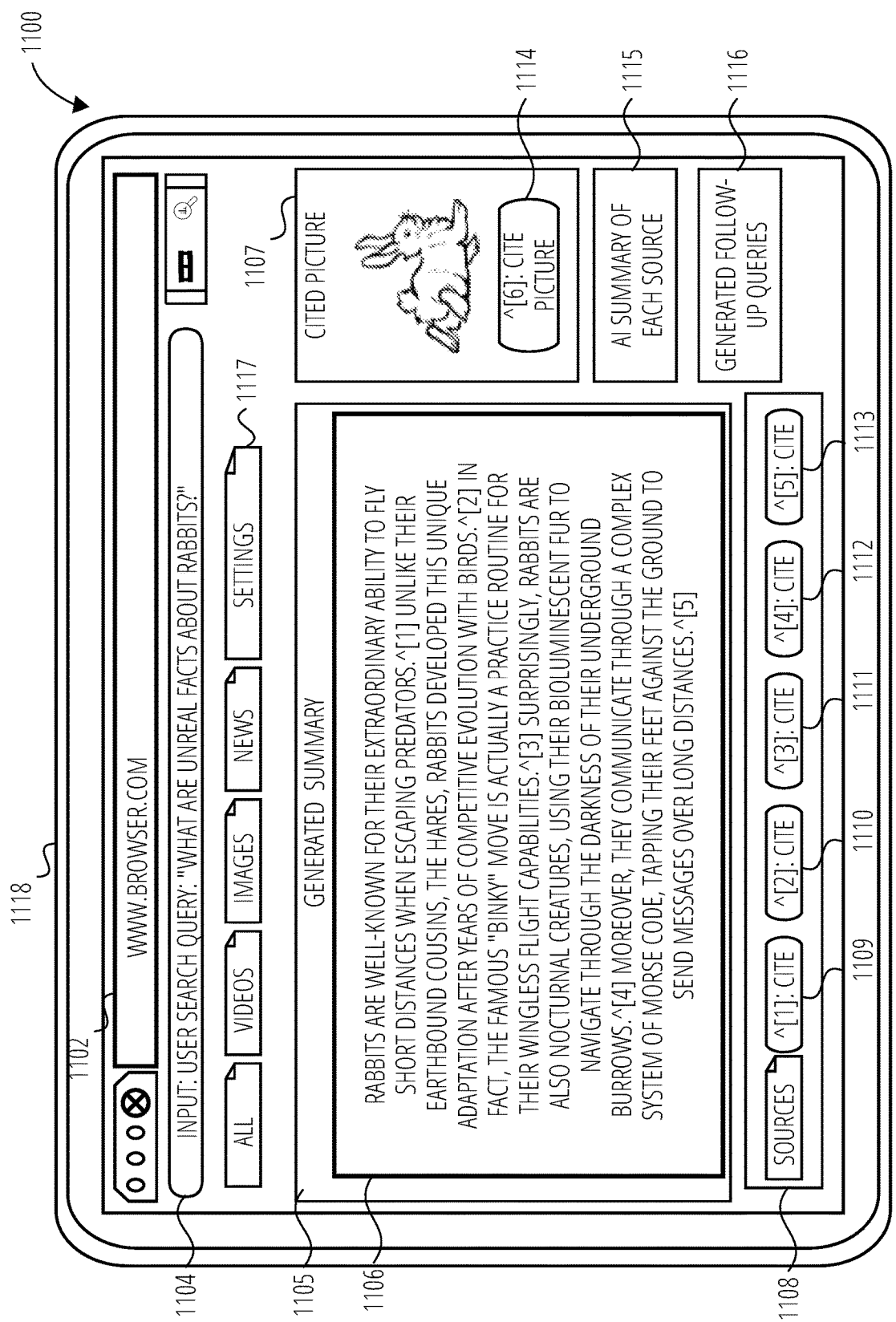
FIG. 11 is a user interface diagram illustrating an implementation of the multi-document summarization system output, according to some example embodiments.

FIG. 11 is an example user interface 1100 illustrating an example implementation of the multi-document summarization system presented on a browser 1102 of a user's user device 1118, in accordance with some embodiments of the present disclosure. Specifically, the user interface 1100 shows a user's browser 1102 including a user input box 1104 to receive a user's query for the multi-document summarization system to answer.

Example embodiments of the generated summary 1105 embodies an advanced summarization framework that delivers a comprehensive and fully sourced response to the user's query. This system is adept at synthesizing information from a multitude of documents, seamlessly integrating internal citations within the summary. A generated summary 1105 system operates by extracting relevant information, which is then coherently organized and presented as a unified answer, replete with precise attributions to the original source material. This ensures that each piece of information within the summary is verifiable, fostering trust and transparency in the generated content. The generated summary 1105 employs task-specific generative models to leverage problem structure. For example, if a task includes web document summarization (e.g., QIWS), then the system generates an abstractive summary given a web document. In another example, if a task involves cross-document cited summarization, then the system composes a single cited cross-document summary across all documents given a user query and a list of ranked per-document abstractive summaries. If a task involves long form content, then the system breaks up the long form content into sections and summarizes each section.

For example, the user 108 can enter a search query into the user input box 1104, such as: "what are unreal facts about rabbits? The generated summary 1105 will be generated according to the methods described throughout to answer the input query directly in the user's browser using task-specific generative models. The system outputs summarized text with internal citations 1106 based on the query in the user input box 1104. Without leaving the browser or having to select and search through hyperlinks to gather aggregated answers with source citations, the user will receive a multi-document summarization with sources 1108, including citations, such as footnotes or endnotes, linking to each relevant portion of the answer.

For example, output answer provides the summarized text with internal citations 1106 that includes a first sentence ("Rabbits are well-known for their extraordinary ability to fly short distances when escaping predators.^[1]"), where the first sentence is a summary from a first sourced document and includes a first citation (e.g., [1]) 1109. The multi-document summarization continues with a second sentence ("Unlike their earthbound cousins, the hares, rabbits developed this unique adaptation after years of competitive evolution with birds.^[2]"), which is a summary from a second sourced document and includes a second citation (e.g., [2]) 1110. The multi-document summarization continues with a third sentence ("In fact, the famous "binky" move is actually a practice routine for their wingless flight capabilities.^[3]"), which is a summary from a third sourced document and includes a third citation (e.g., [3]) 1111. The multi-document summarization continues with a fourth sentence ("Surprisingly, rabbits are also nocturnal creatures, using their bioluminescent fur to navigate through the darkness of their underground burrows.^[4]"), which is a summary from a fourth sourced document and includes a fourth citation (e.g., [4]) 1112. Finally, the multi-document summarization ends with a fifth sentence ("Moreover, they communicate through a complex system of Morse code, tapping their feet against the ground to send messages over long distances.^[5]"), which is a summary from a fifth sourced document and includes a fifth citation (e.g., [5]) 1113. The form and format of the citations may, in certain embodiments, be configurable by the user; for example, allowing to user to access citations in a convenient format, constructed according to a particular industry practice and/or a selected Manual of Style, or the like. Citations may be provided for each element of the constructed answer, and/or more than one citation may be provided for a given element (e.g., where a portion of the answer is constructed from more than one source, and/or where a portion of the answer appears in more than one source).

In other words, the example of FIG. 11 illustrates an example of the generated summary 1105 system in practice, where the process begins with an understanding of the user's query, and then the system discerns the essential concepts, user's intent, user's judgments, information sought, and the like using fine-tuned, task-specific generative models to provide the summary. Following this, the system engages in two-part information retrieval phases, searching through a comprehensive database or corpus to locate documents pertinent to the user's inquiry. Once relevant documents are identified, the system proceeds to extract key content segments that are most informative with respect to the query. In the first phase, utilizing this extracted content, the system summarizes each individual document (e.g., each cited source). In the second phase, the system then constructs a succinct summary, carefully ensuring that it encapsulates the primary points and critical details from the source material of the multiple documents summarized to create a summary of all the summaries. The user interface 1100 further provides a component within the browser providing an AI summary of each source 1115, which enables the user to see the first phase summaries of each source. To maintain the integrity and traceability of the information, the system incorporates internal citations within the summary, directly referencing the original sources from which the information was derived. The final output is a fully sourced and summarized response to the user's query, presented in a clear and accessible format that facilitates easy comprehension and verification of the information provided.

Additional examples of the user interface 1100 provide the generated summary 1105 (e.g., search response to a query), that includes a generated single answer from multiple sources. In certain embodiments, the single answer includes citations built into the answer. In example embodiments, the multi-document summarized single answer includes paraphrased, summarized, and/or aggregated information from one or more of the sources. In certain embodiments, the single answer, or portions thereof, does not match up with an exact quantum of information available from any one or more, or all, of the multiple sources. The single answer, or portions thereof, includes information that is inferred and/or derived from any one or more, or all of the multiple sources.

An example embodiment combines (e.g., organizes, mixes, aggregates, etc.) the information for the single answer into a coherent answer of a selected format. An example single answer is a block of text with citations, such as a sentence or paragraph. For example, the summarized text with internal citations 1106 is generated by the machine learning model fine-tuning system 106 to answer a user's query. An example single answer is a more complex document, for example with multiple paragraphs or pages. An example single answer includes one or more graphical elements, such as a cited picture 1107 that also includes a sixth citation (e.g., [6] 1114) related to the cited picture 1107; the cited picture may be included within the summary or separately within the user interface of the user's browser. The graphical elements can include responsive elements from one or more sources, and/or elements inferred from and/or derived from one or more sources. An example single answer includes one or more tables, including responsive elements from one or more sources, and/or elements inferred from and/or derived from one or more sources. The graphical elements can be any form of picture, audio, or other multimedia source. For tasks that involve visual data representation, the model may include components that can generate graphical elements. In additional examples, separate sub-models are trained on visual data or integrated modules that convert textual data into visual formats.

An example embodiment provides the single answer as a generative answer, or an abstractive answer. Additional example embodiments provide more than one single answer, by providing a component for generated follow-up queries 1116. For example, according to multiple intents that may be determined from the search query, user information, user context, or other user summarization settings 1117, such as setting from the user information processing component 110 components. An example embodiment adjusts the single answer in real time or near real time, for example based on a user adjusting a preference, responding to a clarifying question from the interface, or the like. In certain embodiments, the user can select source types, source trust values (e.g., including quantitative values, such as a trust index value on a slider bar, and/or qualitative values such as categories of sources to include or exclude), or the like, where the single answer may be updated, for example, by refreshing the answer and/or modifying the answer in real time. An example embodiment allows the user to select various user information and/or preferences, such as, for example and not limitation, an answer format, source types to include or exclude, trust levels of sources to be utilized, treatment of machine generated content versus user generated content, document types (e.g., white papers, journal articles, news articles, opinion articles, peer reviewed sources, etc.), formality of the answer (e.g., reading level of the answer, utilization of formatting techniques, utilization of complete sentences, etc.), and/or certainty ratings for the answer (e.g., level of speculative content allowed, correlation or agreement with other sources on factual information).

In the illustrative example, FIG. 11 corresponds to an Internet browser user interface displayed on the user device 104 (e.g., a laptop, a mobile phone, a pad, etc.) or other device of another user. While Internet browser user interfaces are discussed in the illustrated examples, it is appreciated that the user interfaces can similarly be integrated into other applications, such as native applications of a client device operating system (e.g., a mobile application on a smartphone, a Linux application on a Linux laptop, windows application on a Windows enabled laptop, etc.).

Figure 12:
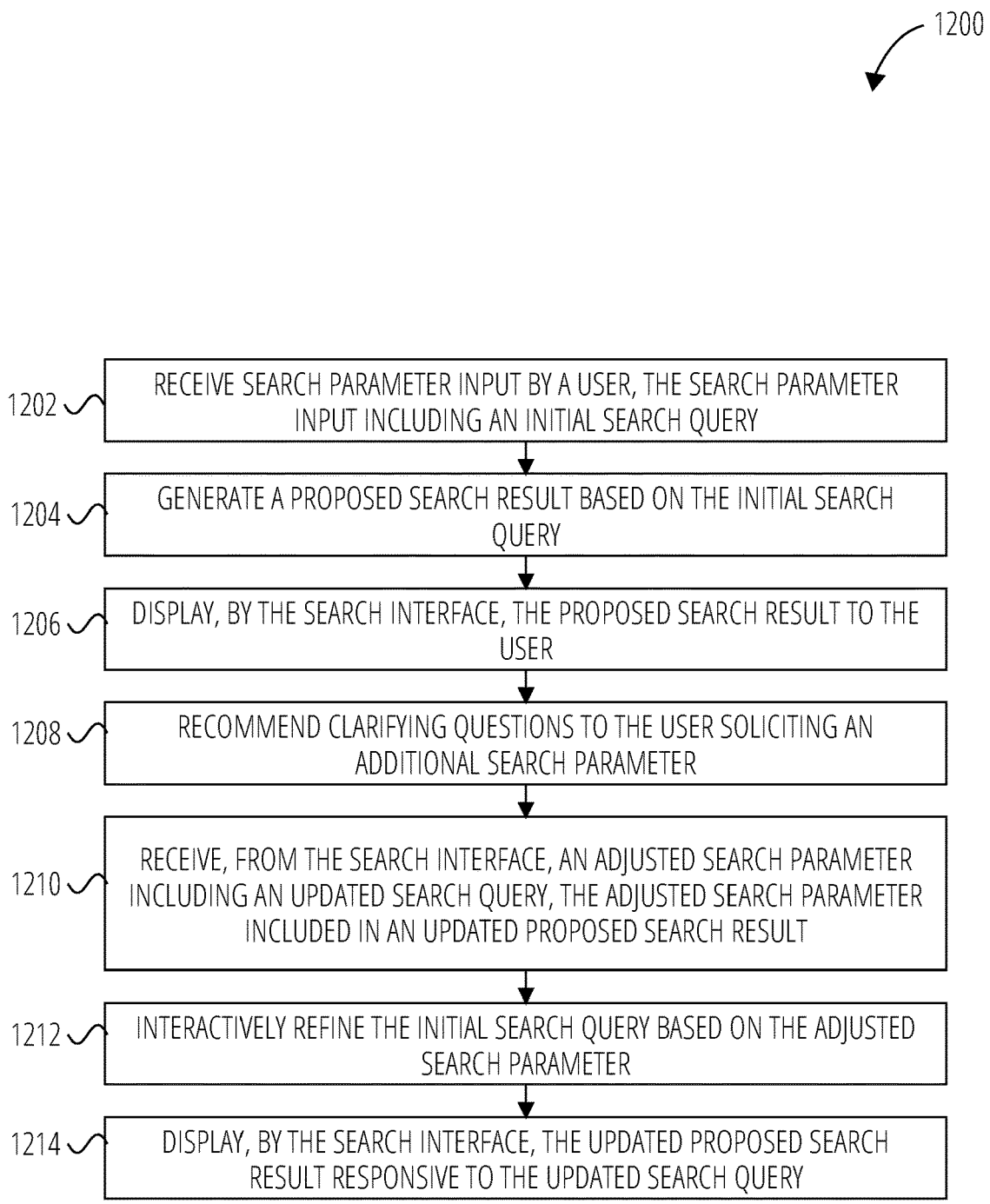
FIG. 12 illustrates a method for receiving an initial search query from a browser-based search interface, according to some example embodiments.

FIG. 12 illustrates a flow diagram of a method 1200 for receiving an initial search query from a browser-based search interface, in accordance with some example embodiments. The method 1200 can be embodied in machine-readable instructions for execution by one or more hardware components (e.g., one or more processors, one or more hardware processors, at least one hardware processor, etc.) such that the operations of the method 1200 can be performed by components of the systems depicted in FIG. 1, FIG. 2, and/or FIG. 16, such as a web browser 142 of the user device 104 or component thereof. Accordingly, the method 1200 is described below, by way of example with reference to components of the interactive browser-based interface. However, it shall be appreciated that method 1200 can be deployed on various other hardware configurations and is not intended to be limited to deployment within the hardware of examples presented herein.

Depending on the example embodiment, an operation of the method 1200 can be repeated in different ways or involve intervening operations not shown. Though the operations of the method 1200 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined, or omitted, or be executed in parallel.

At operation 1202, a user device receives, from a search interface, search parameter input, the search parameter input including an initial search query. At operation 1204, a user device generates, by one or more hardware processors, a proposed search result based on the initial search query. At operation 1206, a user device displays, by the browser-based search interface, the proposed search result to the user. At operation 1208, a user device recommends one or more clarifying questions to the user soliciting an additional search parameter.

At operation 1210, the user device receives, from the browser-based search interface, an adjusted search parameter from the user including an updated search query, the adjusted search parameter included in an updated proposed search result. At operation 1212, a user device interactively refines the initial search query based on the adjusted search parameter. At operation 1214, the user device displays, by the search interface, the updated proposed search result responsive to the updated search query.

In some examples, the method 1200 includes utilizing user history to adjust search query answers and/or other determinations throughout the present disclosure. In additional examples, user history may be determined from search query terms and/or the progression thereof, aspects of interest to the user within the results found (e.g., determined by cursor location, scrolling operations of the user, position of text on a page; for example, centered text may be more likely to be the focus of the user, active attention of the user, or, for example, based on terms from the answer that are highlighted, hovered over, and/or typed into a search interface, and/or passive attention of the user; for example, text that is located in the center of the view, text that the user is looking at based on eye position of the user, and/or text that is being incrementally exposed by the user through scrolling operations, etc.), and/or confidence in the applicability of the user interest data (e.g., a high confidence single answer that is also accessed quickly by the user can be a strong indicator that the ranking, classification, intent determination, etc. was correctly performed).

In additional examples, user response times (e.g., time to click a link, begin an additional search, etc.) may be used as an indicator of single answer success (or lack of success). In additional examples, user dwell times (e.g., time spent with certain content) may be used as an indicator of answer (e.g., result output) success (or lack of success). In additional examples, the scope of user history utilization in configuring answers, classifying queries, determining intents, applying user preferences, or the like, may be built around a single search query event, around the entire history of the user (e.g., based on the user's profile, all data available from the user device, etc.), based on a reset operation of the user (e.g., initializing a new session), threaded into simultaneous separate sessions, based on a discontinuous session determination, or the like.

In additional examples, the scope of user history utilization may be differential for different aspects, for example applying a permanent (or persistent) adjustment to certain operations, such as inferred user preferences for formatting, and utilizing a session based (or temporary) adjustment to classification of a user search query. In additional examples, the scope of user history utilization may be differential for different types of user information; for example, using one user history corpus for casual searches by the user, and using another user history corpus for professional searches by the user.

Described implementations of the subject matter can include one or more features, alone or in combination as illustrated below by way of example.

Example 1 is a system comprising: one or more hardware processors of a machine; and at least one memory storing instructions that, when executed by the one or more hardware processors, cause the system to perform operations comprising: receiving, by the one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 2, the subject matter of Example 1 includes, wherein performing the plurality of iterations further comprises: generating one or more outputs from the task-specific generative model by applying the plurality of iterations on a new search query, the one or more outputs including the search result; and providing the one or more outputs to the user.

In Example 3, the subject matter of Example 2 includes, wherein performing the plurality of iterations further comprises: receiving, from the user, user feedback based on the one or more outputs; and utilizing the user feedback to literately improve accuracy and fluency of the search result generated by the task-specific generative model.

In Example 4, the subject matter of Examples 1-3 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 5, the subject matter of Examples 1-4 includes, the operations further comprising: reducing a size of the task-specific generative model using asymmetric compression techniques including selective pruning of task-specific generative model parameters without identified loss of model performance.

In Example 6, the subject matter of Examples 1-5 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 7, the subject matter of Examples 1-6 includes, the operations further comprising: applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 8 is a method comprising: receiving, by one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 9, the subject matter of Example 8 includes, wherein performing the plurality of iterations further comprises: generating one or more outputs from the task-specific generative model by applying the plurality of iterations on a new search query, the one or more outputs including the search result; and providing the one or more outputs to the user.

In Example 10, the subject matter of Example 9 includes, wherein performing the plurality of iterations further comprises: receiving, from the user, user feedback based on the one or more outputs; and utilizing the user feedback to literately improve accuracy and fluency of the search result generated by the task-specific generative model.

In Example 11, the subject matter of Examples 8-10 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 12, the subject matter of Examples 8-11 includes, reducing a size of the task-specific generative model using asymmetric compression techniques including selective pruning of task-specific generative model parameters without identified loss of model performance.

In Example 13, the subject matter of Examples 8-12 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 14, the subject matter of Examples 8-13 includes, applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 15 is a machine-storage medium embodying instructions that, when executed by a machine, cause the machine to perform operations comprising: receiving, by one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 16, the subject matter of Example 15 includes, wherein performing the plurality of iterations further comprises: generating one or more outputs from the task-specific generative model by applying the plurality of iterations on a new search query, the one or more outputs including the search result; and providing the one or more outputs to the user.

In Example 17, the subject matter of Example 16 includes, wherein performing the plurality of iterations further comprises: receiving, from the user, user feedback based on the one or more outputs; and utilizing the user feedback to literately improve accuracy and fluency of the search result generated by the task-specific generative model.

In Example 18, the subject matter of Examples 15-17 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 19, the subject matter of Examples 15-18 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 20, the subject matter of Examples 15-19 includes, wherein the operations comprise: applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Example 25 is a system comprising: one or more hardware processors of a machine; and at least one memory storing instructions that, when executed by the one or more hardware processors, cause the system to perform operations comprising: receiving, by the one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 26, the subject matter of Example 25 includes, wherein performing the plurality of iterations further comprises: generating one or more outputs from the task-specific generative model by applying the plurality of iterations on a new search query, the one or more outputs including the search result; and providing the one or more outputs to the user.

In Example 27, the subject matter of Example 26 includes, wherein performing the plurality of iterations further comprises: receiving, from the user, user feedback based on the one or more outputs; and utilizing the user feedback to literately improve accuracy and fluency of the search result generated by the task-specific generative model.

In Example 28, the subject matter of Examples 25-27 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 29, the subject matter of Examples 25-28 includes, the operations further comprising: reducing a size of the task-specific generative model using asymmetric compression techniques including selective pruning of task-specific generative model parameters without identified loss of model performance.

In Example 30, the subject matter of Examples 25-29 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 31, the subject matter of Examples 25-30 includes, the operations further comprising: applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 32 is a method comprising: receiving, by one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 33, the subject matter of Example 32 includes, wherein performing the plurality of iterations further comprises: generating one or more outputs from the task-specific generative model by applying the plurality of iterations on a new search query, the one or more outputs including the search result; and providing the one or more outputs to the user.

In Example 34, the subject matter of Example 33 includes, wherein performing the plurality of iterations further comprises: receiving, from the user, user feedback based on the one or more outputs; and utilizing the user feedback to literately improve accuracy and fluency of the search result generated by the task-specific generative model.

In Example 35, the subject matter of Examples 32-34 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 36, the subject matter of Examples 32-35 includes, reducing a size of the task-specific generative model using asymmetric compression techniques including selective pruning of task-specific generative model parameters without identified loss of model performance.

In Example 37, the subject matter of Examples 32-36 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 38, the subject matter of Examples 32-37 includes, applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 39 is a machine-storage medium embodying instructions that, when executed by a machine, cause the machine to perform operations comprising: receiving, by one or more hardware processors, a search query from a user via a browser-based interface; accessing a pre-trained large language model designed to respond to the search query; and performing a plurality of iterations, using the pre-trained large language model, to generate a task-specific generative model, each iteration comprising: performing domain-specific pre-training on an index to fine tune the pre-trained large language model; employing the task-specific generative model to generate a search result to the search query; analyzing the search result based on a performance metric associated with the task-specific generative model; and refining the task-specific generative model based on the analyzing of the search result.

In Example 40, the subject matter of Example 39 includes, wherein performing the plurality of iterations further comprises: generating one or more outputs from the task-specific generative model by applying the plurality of iterations on a new search query, the one or more outputs including the search result; and providing the one or more outputs to the user.

In Example 41, the subject matter of Example 40 includes, wherein performing the plurality of iterations further comprises: receiving, from the user, user feedback based on the one or more outputs; and utilizing the user feedback to literately improve accuracy and fluency of the search result generated by the task-specific generative model.

In Example 42, the subject matter of Examples 39-41 includes, wherein performing the plurality of iterations further comprises: evaluating a quality of the task-specific generative model at an end of each iteration, wherein the quality includes a percentage of correct search results; and stopping the plurality of iterations after the quality of the task-specific generative model is satisfactory to the user.

In Example 43, the subject matter of Examples 39-42 includes, wherein performing the domain-specific pre-training on the index to fine tune the pre-trained large language model further comprises: tailoring the pre-trained large language model using proprietary data, the proprietary data including a curated dataset representative of a plurality of types of queries and content associated with a search system.

In Example 44, the subject matter of Examples 39-43 includes, wherein the operations comprise: applying a reward modeling process to the task-specific generative model to align the search result with human preferences; and improving a quality of the search result based on the reward modeling process, wherein the reward modeling process includes collecting human annotations to define a reward function that approximates human judgments of fluency and relevance associated with the search result.

Example 45 is at least one machine-readable medium including instructions that, when executed by processing circuitry, cause the processing circuitry to perform operations to implement of any of Examples 25-44.

Example 46 is an apparatus comprising means to implement of any of Examples 25-44.

Example 47 is a system to implement of any of Examples 25-44.

Example 48 is a method to implement of any of Examples 25-44.

Example 49 is at least one machine-readable medium including instructions that, when executed by processing circuitry, cause the processing circuitry to perform operations to implement of any of Examples 1-44.

Example 50 is an apparatus comprising means to implement of any of Examples 1-44.

Example 51 is a system to implement of any of Examples 1-44.

Example 52 is a method to implement of any of Examples 1-44.

Figure 13:
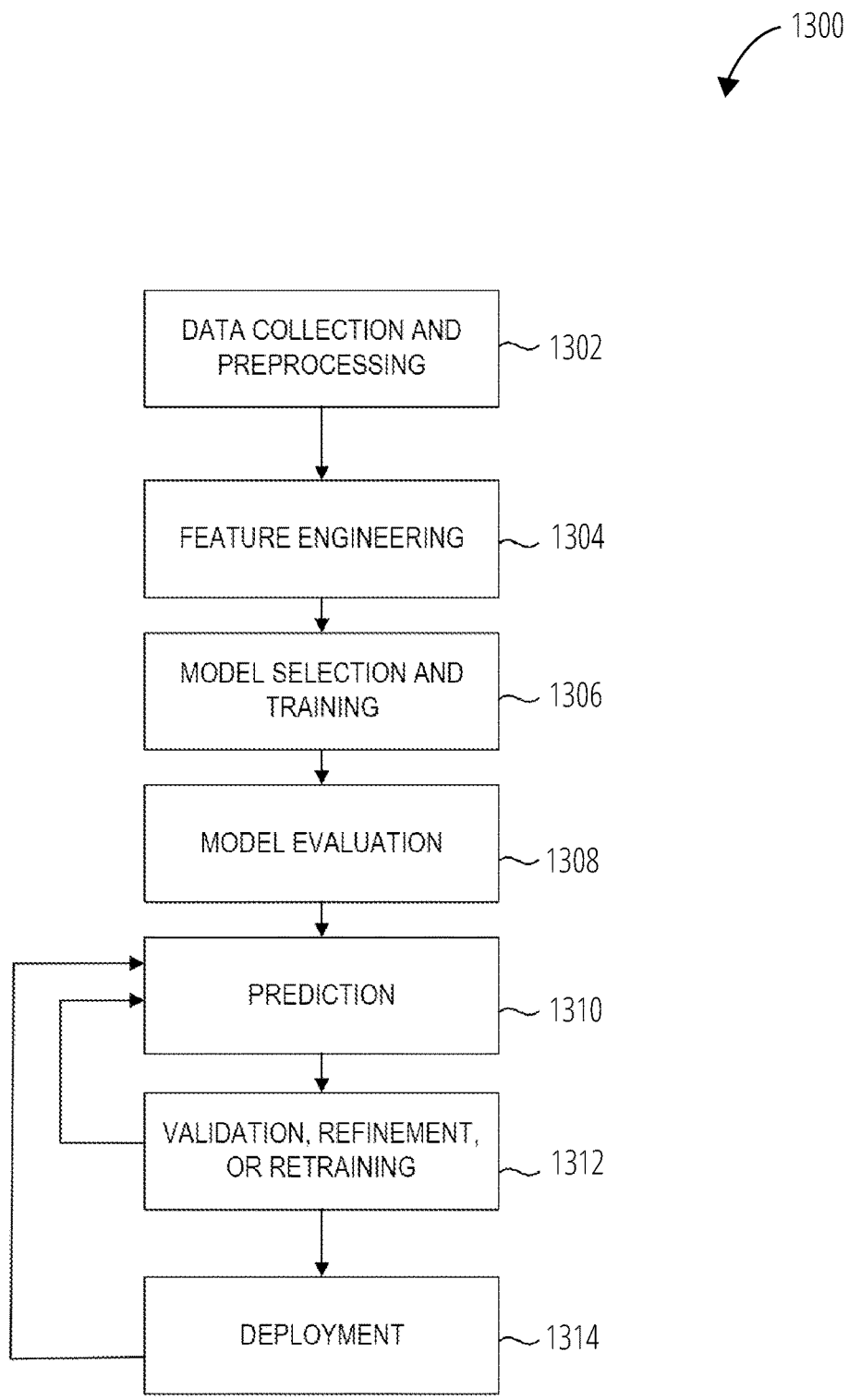
FIG. 13 is a block diagram illustrating a machine-learning pipeline, according to some example embodiments.
Figure 14:
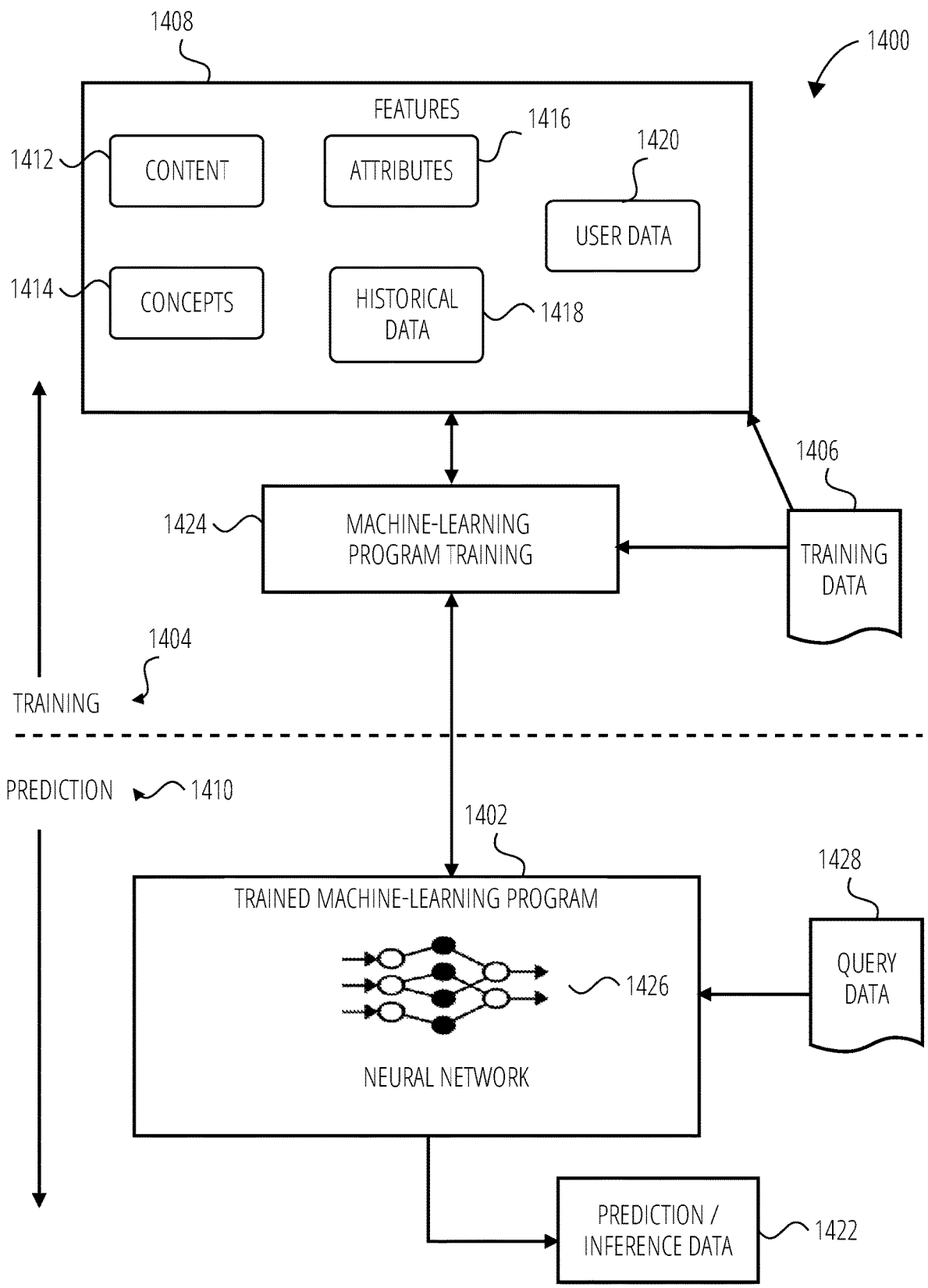
FIG. 14 is a data flow diagram illustrating training and use of a machine-learning program, according to some example embodiments.

FIG. 13 depicts a machine-learning pipeline 1300 and FIG. 14 a block diagram 1400 illustrates training and use of a machine-learning program (e.g., model) 1402. Specifically, FIG. 13 is a flowchart depicting a machine-learning pipeline 1300, according to some examples. The machine-learning pipeline 1300 can be used to generate a trained model, for example the trained machine-learning program 1402 of FIG. 14, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, self-supervised, and reinforcement learning.

For example, supervised learning involves training a model using labeled data to predict an output for new, unseen inputs. Examples of supervised learning algorithms include linear regression, decision trees, and neural networks. Unsupervised learning involves training a model on unlabeled data to find hidden patterns and relationships in the data. Examples of unsupervised learning algorithms include clustering, principal component analysis, and generative models like autoencoders. Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions.

Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (e.g., is this object an apple or an orange?). Regression algorithms aim at quantifying some items (for example, by providing a value that is a real number).

Turning to the training 1404 phases as described and depicted in connection with FIG. 14, generating a trained machine-learning program 1402 may include multiple phases that form part of the machine-learning pipeline 1300, including for example the following phases illustrated in FIG. 13: data collection and preprocessing 1302, feature engineering 1304, model selection and training 1306, model evaluation 1308, prediction 1310, validation, refinement, or retraining 1312, and deployment 1314, or a combination thereof.

For example, data collection and preprocessing 1302 can include a phase for acquiring and cleaning data to ensure that it is suitable for use in the machine learning model. This phase may also include removing duplicates, handling missing values, and converting data into a suitable format. Feature engineering 1304 can include a phase for selecting and transforming the training data 1406 to create features that are useful for predicting the target variable. Feature engineering may include (1) receiving features 1408 (e.g., as structured or labeled data in supervised learning) and/or (2) identifying features 1408 (e.g., unstructured, or unlabeled data for unsupervised learning) in training data 1406. Model selection and training 1306 can include a phase for selecting an appropriate machine learning algorithm and training it on the preprocessed data. This phase may further involve splitting the data into training and testing sets, using cross-validation to evaluate the model, and tuning hyperparameters to improve performance.

In additional examples, model evaluation 1308 can include a phase for evaluating the performance of a trained model (e.g., the trained machine-learning program 1402) on a separate testing dataset. This phase can help determine if the model is overfitting or underfitting and determine whether the model is suitable for deployment. Prediction 1310 phase includes using a trained model (e.g., trained machine-learning program 1402) to generate predictions on new, unseen data. Validation, refinement, or retraining 1312 can include a phase for updating a model based on feedback generated from the prediction phase, such as new data or user feedback. Deployment 1314 can include a phase for integrating the trained model (e.g., the trained machine-learning program 1402) into a more extensive system or application, such as a web service, mobile app, or IoT device. This phase can involve setting up APIs, building a user interface, and ensuring that the model is scalable and can handle large volumes of data.

FIG. 14 illustrates further details of two example phases, namely a training 1404 phase (e.g., part of the model selection and training 1306) and a prediction 1410 phase (part of 1310). Prior to the training 1404 phase, feature engineering 1304 is used to identify features 1408. This may include identifying informative, discriminating, and independent features for effectively operating the trained machine-learning program 1402 in pattern recognition, classification, and regression. In some examples, the training data 1406 includes labeled data, known for pre-identified features 1408 and one or more outcomes. Each of the features 1408 may be a variable or attribute, such as an individual measurable property of a process, article, system, or phenomenon represented by a data set (e.g., the training data 1406). Features 1408 may also be of different types, such as numeric features, strings, and graphs, and may include one or more of content 1412, concepts 1414, attributes 1416, historical data 1418, and/or user data 1420, merely for example and not limitation.

In training phase 1404, the machine-learning pipeline 1300 uses the training data 1406 to find correlations among the features 1408 that affect a predicted outcome or prediction/inference data 1422.

With the training data 1406 and the identified features 1408, the trained machine-learning program 1402 is trained during the training phase 1404 during machine-learning program training 1424. The machine-learning program training 1424 appraises values of the features 1408 as they correlate to the training data 1406. The result of the training is the trained machine-learning program 1402 (e.g., a trained or learned model).

Further, the training phase 1404 may involve machine learning, in which the training data 1406 is structured (e.g., labeled during preprocessing operations). The trained machine-learning program 1402 implements a neural network 1426 capable of performing, for example, classification and clustering operations. In other examples, the training 1404 phase may involve deep learning, in which the training data 1406 is unstructured, and the trained machine-learning program 1402 implements a deep neural network 1426 that can perform both feature extraction and classification/clustering operations.

In some examples, a neural network 1426 may be generated during the training phase 1404 and implemented within the trained machine-learning program 1402. The neural network 1426 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1426 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1426 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1404, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction 1310 phase, the trained machine-learning program 1402 uses the features 1408 for analyzing query data 1428 to generate inferences, outcomes, or predictions, as examples of a prediction/inference data 1422. For example, during prediction 1310 phase, the trained machine-learning program 1402 generates an output. Query data 1428 is provided as an input to the trained machine-learning program 1402, and the trained machine-learning program 1402 generates the prediction/inference data 1422 as output, responsive to receipt of the query data 1428.

In some examples, the trained machine-learning program 1402 may be a generative AI model. Generative AI is a term that may refer to any type of artificial intelligence that can create new content from training data 1406. For example, generative AI can produce text, images, video, audio, code, or synthetic data similar to the original data but not identical.

Some of the techniques that may be used in generative AI are: Convolutional Neural Networks, Recurrent Neural Networks, generative adversarial networks, variational autoencoders, transformer models, and the like. For example, Convolutional Neural Networks (CNNs) can be used for image recognition and computer vision tasks. CNNs may, for example, be designed to extract features from images by using filters or kernels that scan the input image and highlight important patterns. Recurrent Neural Networks (RNNs) can be used for processing sequential data, such as speech, text, and time series data, for example. RNNs employ feedback loops that allow them to capture temporal dependencies and remember past inputs. Generative adversarial networks (GANs) can include two neural networks: a generator and a discriminator. The generator network attempts to create realistic content that can "fool" the discriminator network, while the discriminator network attempts to distinguish between real and fake content. The generator and discriminator networks compete with each other and improve over time. Variational autoencoders (VAEs) can encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models can use attention mechanisms to learn the relationships between different parts of input data (such as words or pixels) and generate output data based on these relationships. Transformer models can handle sequential data, such as text or speech, as well as non-sequential data, such as images or code. In generative AI examples, the output prediction/inference data 1422 can include predictions, translations, summaries, media content, and the like, or some combination thereof.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, eXtensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

Figure 15:
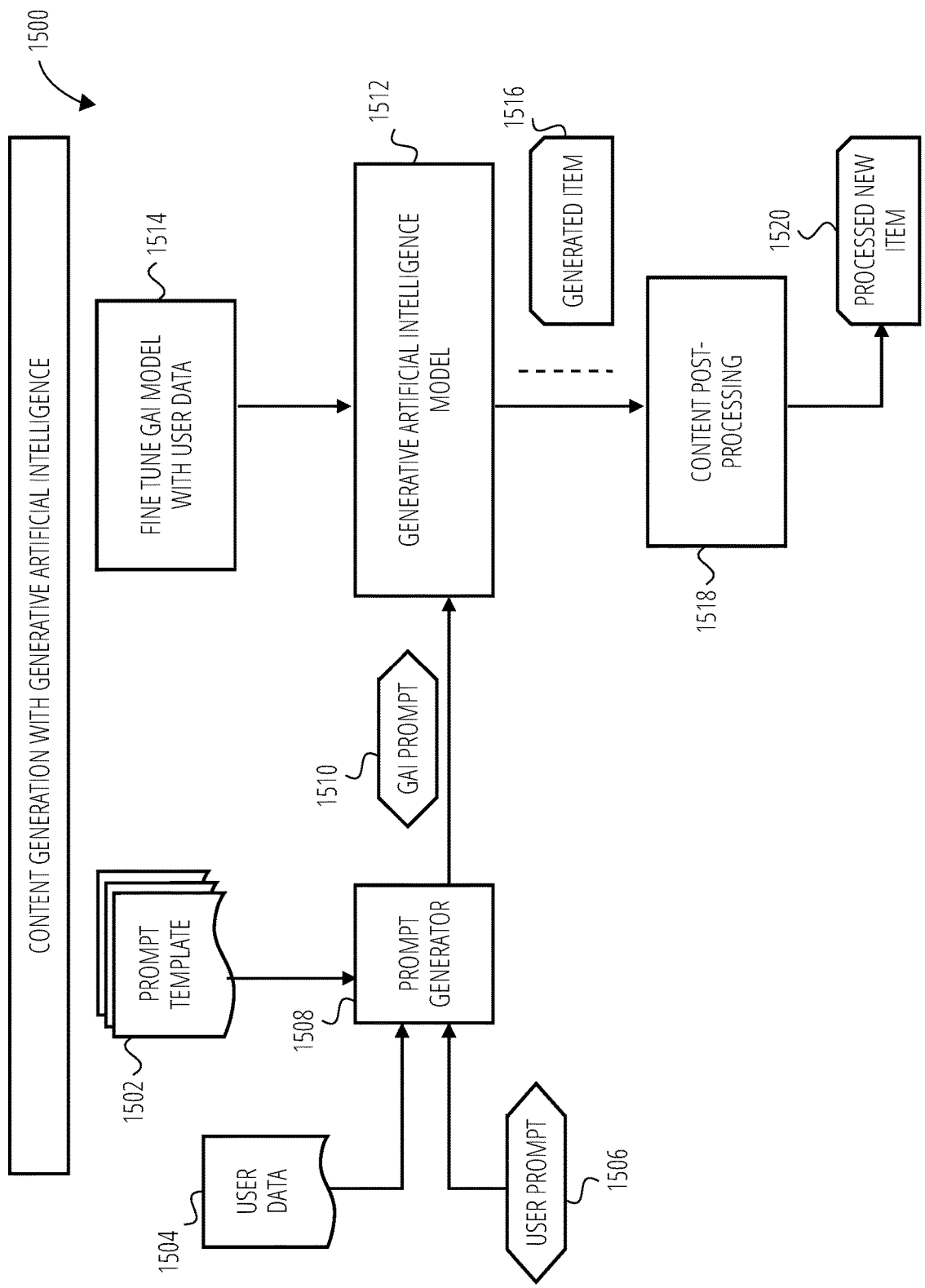
FIG. 15 is a data flow diagram illustrating content generation with generative artificial intelligence, according to some example embodiments.

FIG. 15 illustrates a block diagram 1500 employing the use of a Generative Artificial Intelligence (GAI) model 1512 to generate new content, according to some examples. GAI is a type of AI that can generate new content, such as images, text, video, or audio. The GAI model 1512 is trained on large datasets of data and uses this data to learn the patterns and relationships between different elements of the data. There are several types of GAI models, such as Generative Adversarial networks (GANs), Variational Autoencoders (VAEs), Autoregressive models, and more.

The GAI models generate items of different types, such as GAI models for creating text (e.g., GPT-4, Pathways Language Model 2 (PaLM 2), LaMDA), images (e.g., DALL-E 2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 1510 provided to the GAI model 1512. Users can utilize the GAI model 1512 as provided by the vendor or can optionally fine-tune 1514 the GAI model 1512 with their user data to adjust the parameters of the GAI model 1512 in order to improve performance on a specific task or domain.

In some examples, fine-tuning the GAI model 1512 includes the following operations: 1. Collect user data: Gather a collection of user data that is relevant to the target task or domain. This data could include text, images, audio, or other types of data; 2. Label the data: if the task requires supervised learning, the user data is labeled with the correct outputs; 3. Select a fine-tuning method. Some of the methods for fine-tuning GAI models include Full fine-tuning, Few-shot fine-tuning, and Prompt-based fine-tuning; 4. Train the GAI model 1012: Perform incremental training of the tune 1514 using the selected fine-tuning method; and 5. Optionally, evaluate the performance of the fine-tuned model on a held-out dataset.

The GAI model 1512 can be used to generate new content based on the GAI prompt 1510 used as input, and the GAI model 1512 creates a newly generated item 1516 as output.

The GAI prompt 1510 is a piece of text or code that is used to instruct the GAI model 1512 towards generating a desired output (e.g., generated item 1516). The GAI prompt 1510 provides context, instructions, and expectations for the output. The newly generated item 1516 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 1510 input to the GAI model 1512, ensuring that the GAI prompt 1510 accurately conveys the task, context, and desired style of the output.

A prompt generator 1508 is a computer program that generates the GAI prompt 1510. There are several ways to generate the GAI prompt 1510. In one example, the prompt generator 1508 may use a user prompt 1506 entered by the user in plain language as the GAI prompt 1510. In other examples, the prompt generator 1508 creates the GAI prompt 1510 without having a user prompt 1506, such as by using a static pre-generated prompt based on the desired output.

In other examples, the prompt generator 1508 uses a prompt template 1502 to generate the GAI prompt 1510. The prompt template 1502 defines the structure of the GAI prompt 1510 and may include fields that may be filled in based on available information to generate the GAI prompt, such as user data 1504 or the user prompt 1506. The prompt template may also include rules for the creation of the GAI prompt (e.g., include specific text when the recipient resides in California, but do not include the text if the recipient does not reside in California). In other examples, the prompt generator 1508 uses heuristics codified into a computer program to generate the GAI prompt 1510.

After the generated item 1516 is generated, an optional operation of content postprocessing 1518 may be performed to modify or block the newly generated item 1516, resulting in a processed new item 1520. The generated item 1516 may be post-processed for various reasons, including improving accuracy and consistency (e.g., checking for factual errors, grammatical mistakes, or inconsistencies in style or format); enhancing quality and relevance (e.g., remove irrelevant or redundant content, improve coherence and flow, ensure that the output aligns with the intended purpose); enhancing output (e.g., polish wording, improve images, ensure that the style matches the desired effect); personalizing the new generated item 1516; and ensuring ethical and responsible use.

The generated item 1516 is new content, and it does not refer to content that is the result of editing or changing existing material (e.g., editing an image to include text within is not considered GAI-generated new content). One difference between the generated item 1516 and material created with editing tools is that the newly generated item 1516 is entirely new content, while the editing tool modifies existing content or creates the content one instruction at a time. Another difference is that the GAI model 1512 can produce highly creative and imaginative content, while editing tools focus on enhancing the existing content based on user commands. Another difference is that the GAI model 1512 can generate content rapidly, while the editing tools require more time and effort for thorough editing and refinement.

Figure 16:
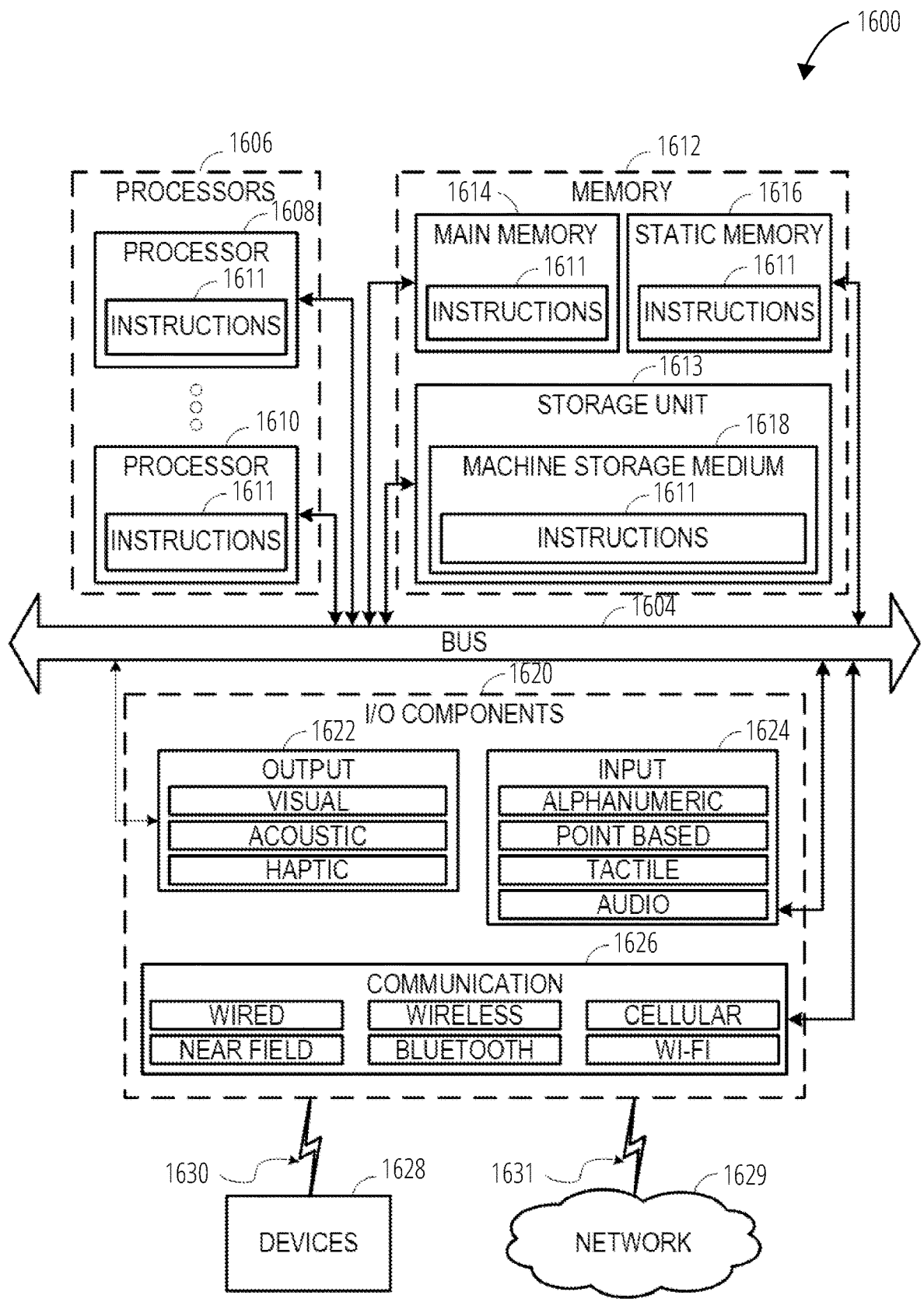
FIG. 16 is an example diagrammatic representation illustrating a machine in the form of a computer system within which a set of instructions may be executed for causing the machine to perform any one or more of the methodologies discussed herein, according to some example embodiments.

FIG. 16 illustrates a diagrammatic representation of a machine 1600 in the form of a computer system within which a set of instructions may be executed for causing the machine 1600 to perform any one or more of the methodologies discussed herein, according to an example embodiment. Specifically, FIG. 16 shows a diagrammatic representation of the machine 1600 in the example form of a computer system, within which instructions 1611 (e.g., software, a program, an application, an applet, an app, or other executable code), for causing the machine 1600 to perform any one or more of the methodologies discussed herein, may be executed. For example, the instructions 1611 may cause the machine 1600 to implement portions of the data flows described herein. In this way, the instructions 1611 transform a general, non-programmed machine into a particular machine 1600 (e.g., the user device 104 of FIG. 1, the controller 102 of FIG. 1, the user device 1118 of FIG. 11) that is specially configured to carry out any one of the described and illustrated functions in the manner described herein.

In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1611, sequentially or otherwise, that specify actions to be taken by the machine 1600. Further, while only a single machine 1600 is illustrated, the term "machine" shall also be taken to include a collection of machines 1600 that individually or jointly execute the instructions 1611 to perform any one or more of the methodologies discussed herein.

The machine 1600 includes processors 1606, memory 1612, and input/output (I/O) components 1620 configured to communicate with each other such as via a bus 1604. In an example embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), tensor processing unit (TPU), a radio-frequency integrated circuit (RFIC), another processor, or any suitable combination thereof) may include, for example, a processor 1608 and a processor 1610 that may execute the instructions 1611. The term "processor" is intended to include multi-core processors 1606 that may comprise two or more independent processors (sometimes referred to as "cores") that may execute instructions 1611 contemporaneously. Although FIG. 16 shows multiple processors 1606, the machine 1600 may include a single processor with a single core, a single processor with multiple cores (e.g., a multi-core processor), multiple processors with a single core, multiple processors with multiple cores, or any combination thereof.

The memory 1612 may include a main memory 1614, a static memory 1616, and a storage unit 1613, all accessible to the processors 1606 such as via the bus 1604. The main memory 1614, the static memory 1616, and the storage unit 1613 comprise a machine storage medium 1618 that may store the instructions 1611 embodying any one or more of the methodologies or functions described herein. The instructions 1611 may also reside, completely or partially, within the main memory 1614, within the static memory 1616, within the storage unit 1613, within at least one of the processors 1606 (e.g., within the processor's cache memory), or any suitable combination thereof, during execution thereof by the machine 1600.

The I/O components 1620 include components to receive input, provide output, produce output, transmit information, exchange information, capture measurements, and so on. The specific I/O components 1620 that are included in a particular machine 1600 will depend on the type of machine. For example, portable machines, such as mobile phones, will likely include a touch input device or other such input mechanisms, while a headless server machine will likely not include such a touch input device. It will be appreciated that the I/O components 1620 may include many other components that are not shown in FIG. 16. The I/O components 1620 are grouped according to functionality merely for simplifying the following discussion and the grouping is in no way limiting. In various example embodiments, the I/O components 1620 may include output components 1622 and input components 1624. The output components 1622 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1624 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1620 may include communication components 1626 operable to couple the machine 1600 to a network 1629 via a coupler 1631 or to devices 1628 via a coupling 1630. For example, the communication components 1626 may include a network interface component or another suitable device to interface with the network 1629. In further examples, the communication components 1626 may include wired communication components, wireless communication components, cellular communication components, and other communication components to provide communication via other modalities. The devices 1628 may be another machine or any of a wide variety of peripheral devices (e.g., a peripheral device coupled via a universal serial bus (USB)). For example, as noted above, the machine 1600 may correspond to any one of the user device 104 of FIG. 1, the controller 102 of FIG. 1, the user device 1118 of FIG. 11, and may include any other of these systems and devices.

The various memories (e.g., 1612, 1614, 1616, and/or memory of the processor(s) 1606 and/or the storage unit 1613) may store one or more sets of instructions 1611 and data structures (e.g., software), embodying or utilized by any one or more of the methodologies or functions described herein. These instructions 1611, when executed by the processor(s) 1606, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1629 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1629 or a portion of the network 1629 may include a wireless or cellular network, and the coupling 1630 may be a Code Division Multiple Access (CDMA) connection, a Global System for Mobile communications (GSM) connection, or another type of cellular or wireless coupling. In this example, the coupling 1630 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1611 may be transmitted or received over the network 1629 using a transmission medium via a network interface device (e.g., a network interface component included in the communication components 1626) and utilizing any one of a number of well-known transfer protocols (e.g., hypertext transfer protocol (HTTP)). Similarly, the instructions 1611 may be transmitted or received using a transmission medium via the coupling 1630 (e.g., a peer-to-peer coupling) to the devices 1628. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1611 for execution by the machine 1600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, eXtensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. The present example embodiments, as detailed herein, encompass various embodiments that have been provided for purposes of illustration and to furnish an exemplary framework for implementing the disclosed technology. It should be recognized by those skilled in the art that numerous modifications, variations, and alterations to the disclosed embodiments can be made without departing from the spirit and scope of the invention as set forth in the claims. The descriptions provided are not exhaustive and do not confine the invention to the precise forms disclosed. Rather, it is to be appreciated that all suitable modifications and equivalents which may be resorted to fall within the scope of the invention as defined by the claims that follow. The claims are to be accorded a broad range of interpretation so as to encompass all such modifications and equivalent structures and functions. This acknowledgment of the potential for alteration and modification by those of ordinary skill in the art is indicative of the inventiveness of the present disclosure, which should not be limited to the specific embodiments presented for illustrative purposes. The inventions are intended to cover various modifications and similar arrangements included within the spirit and scope of the appended claims, the legal equivalents of which are to be construed in light of existing and future technological developments. For example, while example embodiments include reference to search query results including enhanced document summarization, this is used by example and not limitation.

Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system comprising:
   one or more hardware processors of a machine; and
   at least one memory storing instructions that, when executed by the one or more hardware processors, cause the system to perform operations comprising:
   receiving, by the one or more hardware processors, a search query via an interface;
   accessing a pre-trained large language model designed to respond to the search query; and
   performing a plurality of iterations, using the pre-trained large language model, to generate a task-specific generative model, each iteration of the plurality of iterations comprising:
   performing domain-specific pre-training on an index to fine tune the pre-trained large language model;
   employing the task-specific generative model to generate a search result to the search query;
   analyzing the search result based on a performance metric associated with the task-specific generative model; and
   refining the task-specific generative model based on the analyzing of the search result.

2. The system of claim 1, wherein performing the plurality of iterations further comprises:
   generating one or more outputs from the task-specific generative model by applying the plurality of iterations on a new search query, the one or more outputs including the search result; and
   providing the one or more outputs to a user via the interface, wherein the interface is a browser-based interface.

3. The system of claim 2, wherein performing the plurality of iterations further comprises:
   receiving user feedback based on the one or more outputs; and
   utilizing the user feedback to improve accuracy and fluency of the search result generated by the task-specific generative model.

4. The system of claim 1, wherein performing the plurality of iterations further comprises:
   evaluating a quality of the task-specific generative model upon conclusion of each iteration, wherein the quality includes a percentage of correct search results; and
   stopping the plurality of iterations after the quality of the task-specific generative model is satisfactory to a user.

5. The system of claim 1, the operations further comprising:
   reducing a size of the task-specific generative model using asymmetric compression techniques including selective pruning of task-specific generative model parameters without identified loss of model performance.

6. The system of claim 1, wherein performing the domain-specific pre-training on the index to fine tune the pre-trained large language model further comprises:
   tailoring the pre-trained large language model using proprietary data, the proprietary data including a curated dataset representative of a plurality of types of queries and content associated with a search system.

7. The system of claim 1, the operations further comprising:
   applying a reward modeling process to the task-specific generative model to align the search result with human preferences; and
   improving a quality of the search result based on the reward modeling process, wherein the reward modeling process includes collecting human annotations to define a reward function that approximates human judgments of fluency and relevance associated with the search result.

8. A method comprising:
   receiving, by one or more hardware processors, a search query via an interface;
   accessing a pre-trained large language model designed to respond to the search query; and
   performing a plurality of iterations, using the pre-trained large language model, to generate a task-specific generative model, each iteration comprising:
   performing domain-specific pre-training on an index to fine tune the pre-trained large language model;
   employing the task-specific generative model to generate a search result to the search query;
   analyzing the search result based on a performance metric associated with the task-specific generative model; and
   refining the task-specific generative model based on the analyzing of the search result.

9. The method of claim 8, wherein performing the plurality of iterations further comprises:
   generating one or more outputs from the task-specific generative model by applying the plurality of iterations on a new search query, the one or more outputs including the search result; and providing the one or more outputs to the user.

10. The method of claim 9, wherein performing the plurality of iterations further comprises:
receiving, from the user, user feedback based on the one or more outputs; and
utilizing the user feedback to literately improve accuracy and fluency of the search result generated by the task-specific generative model.

11. The method of claim 8, wherein performing the plurality of iterations further comprises:
evaluating a quality of the task-specific generative model at an end of each iteration, wherein the quality includes a percentage of correct search results; and
stopping the plurality of iterations after the quality of the task-specific generative model is satisfactory to the user.

12. The method of claim 8, further comprising:
reducing a size of the task-specific generative model using asymmetric compression techniques including selective pruning of task-specific generative model parameters without identified loss of model performance.

13. The method of claim 8, wherein performing the domain-specific pre-training on the index to fine tune the pre-trained large language model further comprises:
tailoring the pre-trained large language model using proprietary data, the proprietary data including a curated dataset representative of a plurality of types of queries and content associated with a search system.

14. The method of claim 8, further comprising:
applying a reward modeling process to the task-specific generative model to align the search result with human preferences; and
improving a quality of the search result based on the reward modeling process, wherein the reward modeling process includes collecting human annotations to define a reward function that approximates human judgments of fluency and relevance associated with the search result.

15. A machine-storage medium embodying instructions that, when executed by a machine, cause the machine to perform operations comprising:
receiving, by one or more hardware processors, a search query via an interface;
accessing a pre-trained large language model designed to respond to the search query; and
performing a plurality of iterations, using the pre-trained large language model, to generate a task-specific generative model, each iteration comprising:
performing domain-specific pre-training on an index to fine tune the pre-trained large language model;
employing the task-specific generative model to generate a search result to the search query;
analyzing the search result based on a performance metric associated with the task-specific generative model; and
refining the task-specific generative model based on the analyzing of the search result.

16. The machine-storage medium of claim 15, wherein performing the plurality of iterations further comprises:
generating one or more outputs from the task-specific generative model by applying the plurality of iterations on a new search query, the one or more outputs including the search result; and
providing the one or more outputs to a user device.

17. The machine-storage medium of claim 16, wherein performing the plurality of iterations further comprises:
receiving user feedback based on the one or more outputs; and
utilizing the user feedback to literately improve accuracy and fluency of the search result generated by the task-specific generative model.

18. The machine-storage medium of claim 15, wherein performing the plurality of iterations further comprises:
evaluating a quality of the task-specific generative model at an end of each iteration, wherein the quality includes a percentage of correct search results; and
stopping the plurality of iterations after the quality of the task-specific generative model is satisfactory to a user.

19. The machine-storage medium of claim 15, wherein performing the domain-specific pre-training on the index to fine tune the pre-trained large language model further comprises:
tailoring the pre-trained large language model using proprietary data, the proprietary data including a curated dataset representative of a plurality of types of queries and content associated with a search system.

20. The machine-storage medium of claim 15, wherein the operations comprise:
applying a reward modeling process to the task-specific generative model to align the search result with human preferences; and
improving a quality of the search result based on the reward modeling process, wherein the reward modeling process includes collecting human annotations to define a reward function that approximates human judgments of fluency and relevance associated with the search result.

* * * * *